(12) United States Patent
Carlsson et al.

(10) Patent No.: US 11,757,183 B2
(45) Date of Patent: Sep. 12, 2023

(54) EFFICIENT ANTENNA CALIBRATION FOR LARGE ANTENNA ARRAYS

(71) Applicant: Telefonaktiebolaget LM Ericsson (publ), Stockholm (SE)

(72) Inventors: Torsten John Carlsson, Lund (SE); Christian Braun, Vallentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 361 days.

(21) Appl. No.: 17/272,327

(22) PCT Filed: Aug. 31, 2018

(86) PCT No.: PCT/EP2018/073482
§ 371 (c)(1),
(2) Date: Feb. 28, 2021

(87) PCT Pub. No.: WO2020/043310
PCT Pub. Date: Mar. 5, 2020

(65) Prior Publication Data
US 2022/0149517 A1    May 12, 2022

(51) Int. Cl.
*H01Q 3/26* (2006.01)
*H04B 17/12* (2015.01)
*H01Q 21/06* (2006.01)

(52) U.S. Cl.
CPC ........... *H01Q 3/267* (2013.01); *H01Q 21/061* (2013.01); *H04B 17/12* (2015.01)

(58) Field of Classification Search
CPC ........ H01Q 3/267; H01Q 3/26; H01Q 21/061; H01Q 21/06; H01Q 21/24; H01Q 21/0025; H01Q 21/29; H01Q 23/00; H04B 17/12; H04B 17/21; H04B 17/11; H04B 17/19; H04B 17/0085; H04W 24/08; H04W 24/06; H04W 24/00; H04W 24/02; G01R 35/00; G01R 35/005
See application file for complete search history.

(56) References Cited

U.S. PATENT DOCUMENTS

| 5,657,023 A | 8/1997 | Lewis et al. |
| 6,339,399 B1 | 1/2002 | Andersson et al. |
| 10,470,095 B2 | 11/2019 | Davis |
| 10,615,495 B1 * | 4/2020 | Loui ............... H01Q 3/267 |

(Continued)

FOREIGN PATENT DOCUMENTS

| EP | 1178562 A1 | 2/2002 |
| WO | 2016176626 A1 | 11/2016 |

(Continued)

OTHER PUBLICATIONS

Lopez Morales, Manuel Jose, "mm-Wave Antenna Array Calibration and Validation," Master's Thesis, Department of Electrical and Information Technology at Lund University, Feb. 23, 2018, 98 pages.

(Continued)

*Primary Examiner* — Seokjin Kim
(74) *Attorney, Agent, or Firm* — Withrow & Terranova, PLLC

(57) ABSTRACT

Systems and methods for providing efficient antenna calibration that are particularly beneficial for a radio system having a large antenna array are disclosed.

18 Claims, 14 Drawing Sheets

(56) References Cited

U.S. PATENT DOCUMENTS

| | | |
|---|---|---|
| 2006/0128436 A1 | 6/2006 | Doi et al. |
| 2011/0250857 A1 | 10/2011 | Reial et al. |
| 2017/0346575 A1 | 11/2017 | Tang et al. |
| 2018/0040964 A1* | 2/2018 | Benjebbour ........... H01Q 21/06 |

FOREIGN PATENT DOCUMENTS

| | | | |
|---|---|---|---|
| WO | 2017211408 A1 | 12/2017 | |
| WO | WO-2018166575 A1 * | 9/2018 | ............. H01Q 3/267 |
| WO | 2020119910 A1 | 6/2020 | |

OTHER PUBLICATIONS

Neidman, Y., et al., "Diagnostic of phased arrays with faulty elements using the mutual coupling method," IET Microw. Antennas Propag., vol. 3, No. 2, The Institution of Engineering and Technology, 2009, pp. 235-241.

Shipley, Charles, et al., "Mutual Coupling-Based Calibration of Phased Array Antennas," IEEE International Conference on Phased Array Systems and Technology, 2000, Dana Point, California, USA, pp. 529-532.

International Search Report and Written Opinion for International Patent Application No. PCT/EP2018/073482, dated May 24, 2019, 14 pages.

International Search Report and Written Opinion for International Patent Application No. PCT/CN2021/142449, dated Aug. 19, 2022, 22 pages.

* cited by examiner

FIG. 3

EFFICIENT ANTENNA CALIBRATION FOR LARGE ANTENNA ARRAYS

This application is a 35 U.S.C. § 371 national phase filing of International Application No. PCT/EP2018/073482, filed Aug. 31, 2018, the disclosure of which is incorporated herein by reference in its entirety.

TECHNICAL FIELD

The present disclosure relates to antenna calibration for a radio system having a large antenna array.

BACKGROUND

One key attribute for future Fifth Generation (5G) radio systems is increased capacity in radio networks. Beamforming is one technology that will be used by 5G radio systems to provide the desired increased capacity in an efficient manner. In particular, a 5G radio base station will utilize a large antenna array including tens if not hundreds of antennas, which are also referred to herein as antenna elements. Each antenna element is connected to a radio transceiver path. Applying proper scaling in the transceiver paths enables beamforming by efficient control of spatial coherent additions of desired signals and coherent subtractions of unwanted signals. Such beamforming is used both to enable high antenna gain to a desired User Equipment (UE) as well as to enable parallel communication to several UEs using the same time/frequency resource by using orthogonal spatial communication paths (i.e., by using orthogonal beams).

One issue that arises when implementing a radio base station that utilizes beamforming is that there are variations in gain and phase between different antenna paths (i.e., between different radio transmitter paths and between different radio receiver paths). To enable precise beamforming, full control of vector additions of high frequency radio signals is needed. Hence, very accurate control of amplitude and phase are required. This accuracy is needed in every transceiver path. In order to achieve this accuracy, a calibration procedure needs to be applied to compensate for amplitude and phase variations between different transceiver paths.

Since large antenna array radio base stations are new for commercial usage, no efficient method exists for this calibration. Existing methods are time consuming and costly. For example, one existing solution is to calibrate antenna behavior in an anechoic test chamber. This is done by stepwise transmission of test signals from each antenna element of the radio base station to a fixed receiver antenna placed at far field distance. For each individual transmitter, the test signal is scaled to receive a predefined wanted signal. The procedure is then reversed for all receivers. Note that scaling, in the general case, changes over the used bandwidth; hence, the test signal either has to be defined to simultaneously extract several calibration signals over multiple subbands of the full bandwidth of the radio system or a simpler narrowband test signal has to be repeated over the full bandwidth. This procedure is very time consuming and requires availability of an anechoic test chamber to perform a calibration. If parts need to be replaced in the base station, there is a high risk that a full recalibration will be required in an anechoic test chamber. Another problem is that the scaling is very sensitive. The base station has to work properly over a wide temperature range and take into account aging effects of individual components. It is very difficult to calibrate a system that does not degrade in performance over time.

Another existing method for calibrating a large antenna array radio base station is to include Radio Frequency (RF) coupler elements close to the antenna elements. These coupler elements can be used to extract and/or inject calibration signals and measure the differences between branches in order to find the scaling factors to achieve amplitude and phase calibration. These coupler elements and associated networks are bulky and add significant cost to the radio base station. In addition, measurement uncertainty increases at high frequency when coupler elements are used.

Another existing method for calibrating a large antenna array radio base station is to combine prior knowledge of couplings between individual antenna elements in the antenna array with coupling measurements obtained by transmitting a test signal over one transmitter path connected to an antenna element and then receiving the test signal on another antenna element connected to a receive path. With a large enough set of such measurements, an estimation algorithm can be used to estimate the scaling factors to be used in different transceiver paths. The benefit of this method is that, with the assumption on known couplings between antenna elements, the calibration does not require an anechoic test chamber or dedicated coupler elements. However, since many measurements need to be performed, this method is still time consuming.

As such, there is a need for a calibration procedure for a large antenna array radio system (e.g., a 5G base station) that is efficient and does not require an anechoic test chamber or dedicated coupler elements.

SUMMARY

Systems and methods for providing efficient antenna calibration that are particularly beneficial for a radio system having a large antenna array are disclosed. In some embodiments, a radio system comprises an antenna system and a processing unit. The antenna system comprises a plurality of antenna elements, a plurality of transmit branches coupled to the plurality of antenna elements, respectively, and a plurality of receive branches coupled to the plurality of antenna elements, respectively. Together, the antenna system and the processing unit are adapted to perform a number of functions for a first predefined measurement pattern that defines a first subset of the plurality of antenna elements as a plurality of transmit antenna elements and a second subset of the plurality of antenna elements as a plurality of receive antenna elements. The first subset of the plurality of antenna elements and the second subset of the plurality of antenna elements are disjoint sets. In particular, for the first predefined measurement pattern, a plurality of orthogonal test signals for the plurality of transmit antenna elements, respectively, are generated using a respective plurality of orthogonal codes and simultaneously transmitted via the plurality of transmit antenna elements, respectively. In addition, for the first predefined measurement pattern, a plurality of combined receive signals are received via the plurality of receive antenna elements, respectively, during the simultaneous transmission of the plurality of orthogonal test signals via the plurality of transmit antenna elements due to electromagnetic coupling (simply referred to herein as "coupling") between the plurality of receive antenna elements and the plurality of transmit antenna elements. Further, for each receive antenna element of the plurality of receive antenna elements, the respective combined receive signal is decoded using a subset of the plurality of orthogonal codes used to generate the orthogonal test signals for a subset of the plurality of transmit antenna elements predefined for the receive antenna element to thereby provide a separate receive signal received via the receive antenna element from each transmit antenna element in the subset of the plurality of transmit antenna elements. Different subsets of the plurality of transmit antenna elements are predefined for different ones of the plurality of receive antenna elements. Amplitude and phase calibration values are computed for at least some of the plurality of transmit branches and/or at least some of the plurality of receive branches based on the separate receive signals received via the plurality of receive antenna elements from the respective subsets of the plurality of transmit antenna elements. By using the orthogonal test signals and by limiting measurements for each receive antenna element to only a subset of the transmit antenna elements, antenna calibration can be performed in an efficient manner.

In some embodiments, the plurality of orthogonal test signals for the plurality of transmit antenna elements are generated using a root sequence and a respective plurality of orthogonal codes. In some embodiments, the root sequence is a representation of a frequency domain signal consisting of a set of equal amplitude frequency tones equally spaced over a bandwidth used by the radio system. In some embodiments, the root sequence is a time domain signal that is a time domain representation of a frequency domain signal consisting of a set of equal amplitude frequency tones equally spaced over a bandwidth used by the radio system, and relative phase of the equal amplitude frequency tones is such that a peak-to-average ratio on the time domain signal is minimized.

In some embodiments, each of the plurality of orthogonal codes is a Hadamard or Orthogonal Variable Spreading Factor (OVSF) code or Walsh code consisting of a plurality of code values each being a value of +1 or −1.

In some embodiments, the plurality of antenna elements are arranged into a N×M matrix of antenna elements, wherein N+M≥6. The plurality of transmit antenna elements are distributed across the N×M matrix in a manner defined by the first predefined measurement pattern, and the plurality of receive antenna elements are distributed across the N×M matrix in a manner defined by the first predefined measurement pattern. Further, in some embodiments, the plurality of transmit antenna elements are antenna elements in the N×M matrix of antenna elements for which an amount of coupling between any pair of those antenna elements is less than a predefined threshold amount and the plurality of transmit antenna elements are arranged such that possible transmit-receive antenna element combinations with dominant coupling is maximized. Further, in some embodiments, for each receive antenna element of the plurality of receive antenna elements, the subset of the plurality of transmit antenna elements predefined for the receive antenna element consists of one or more of the plurality of transmit antenna elements for which an amount of coupling between each of the one or more of the plurality of transmit antenna elements and the receive antenna element is greater than a predefined threshold amount.

In some embodiments, the plurality of antenna elements are arranged into a N×M matrix of antenna elements, wherein N+M≥6. The first predefined measurement pattern is a diagonal measurement pattern that: defines the plurality of transmit antenna elements as antenna elements in the N×M matrix of antenna elements that form one or more first diagonals in the N×M matrix; and defines the plurality of receive antenna elements as antenna elements in the N×M matrix of antenna elements that form two or more second diagonals in the N×M matrix that are interleaved with the one or more first diagonals in the N×M matrix. In some embodiments, the first predefined measurement pattern defines the plurality of transmit antenna elements as antenna elements in the N×M matrix of antenna elements that form two or more first diagonals in the N×M matrix, and the two or more second diagonals are interleaved with the two or more first diagonals in the N×M matrix such that two of the two or more second diagonals are between each diagonally adjacent pair of the two or more first diagonals. In some embodiments, for a receive antenna element of the plurality of receive antenna elements, the subset of the plurality of transmit antenna elements predefined for the receive antenna element consists of: a nearest transmit antenna element above the receive antenna element in the N×M matrix of antenna elements; a nearest transmit antenna element below the receive antenna element in the N×M matrix of antenna elements; a nearest transmit antenna element to the right of the receive antenna element in the N×M matrix of antenna elements; a nearest transmit antenna element to the left of the receive antenna element in the N×M matrix of antenna elements; and a nearest transmit antenna element diagonal from the receive antenna element in the N×M matrix of antenna elements.

In some embodiments, together, the antenna system and the processing unit are further adapted to perform functions for a second predefined measurement pattern that defines a third subset of the plurality of antenna elements as a second plurality of transmit antenna elements and a fourth subset of the plurality of antenna elements as a second plurality of receive antenna elements. The third subset of the plurality of antenna elements and the fourth subset of the plurality of antenna elements are disjoint sets. In particular, a second plurality of orthogonal test signals for the second plurality of transmit antenna elements, respectively, are generated using a base sequence and a respective plurality of orthogonal codes, and simultaneously transmitted via the second plurality of transmit antenna elements, respectively. For the second predefined measurement pattern, a second plurality of combined receive signals are received via the plurality of receive antenna elements, respectively, during the simultaneous transmission of the second plurality of orthogonal test signals via the second plurality of transmit antenna elements due to coupling between the second plurality of receive antenna elements and the second plurality of transmit antenna elements. For each receive antenna element of the second plurality of receive antenna elements, the respective second combined receive signal is decoded using a subset of the second plurality of orthogonal codes used to generate the orthogonal test signals for a subset of the second plurality of transmit antenna elements predefined for the receive antenna element to thereby provide a separate receive signal received via the receive antenna element from each transmit antenna element in the subset of the second plurality of transmit antenna elements. Different subsets of the second plurality of transmit antenna elements are predefined for different ones of the second plurality of receive antenna elements. The amplitude and phase calibration values are computed for the at least some of the plurality of transmit branches and/or at least some of the plurality of receive branches based on the separate receive signals received via the plurality of receive antenna elements from the respective subsets of the plurality of transmit antenna elements and the separate receive signals received via the second plurality of receive antenna elements from the respective subsets of the second plurality of transmit antenna elements.

In some embodiments, for each receive antenna element of the plurality of receive antenna elements, the subset of the plurality of transmit antenna elements predefined for the receive antenna element consists of those transmit antenna elements from among the plurality of transmit antenna elements for which a coupling with the receive antenna element is predetermined to be greater than a predetermined threshold.

In some embodiments, the antenna system or the processing unit is further adapted to generate the plurality of orthogonal test signals in the time domain. In some embodiments, the plurality of orthogonal test signals for the plurality of transmit antenna elements are generated using a root sequence and a respective plurality of orthogonal codes, the root sequence is a time domain root sequence comprising a plurality of sample values. In order to generate the plurality of orthogonal test signals for the plurality of transmit antenna elements, respectively, the antenna system or the processing unit is further adapted to, in the time domain for each transmit antenna element of the plurality of transmit antenna elements, for each code value in the respective orthogonal code, encode a plurality of repetitions of the time domain root sequence using the code value to thereby provide the orthogonal test signal for the transmit antenna element. In some embodiments, the processing unit is further adapted to apply the amplitude and phase calibration values for the at least some of the plurality of transmit branches and/or the at least some of the plurality of receive branches.

Embodiments of a method of self-calibrating a radio system are also disclosed. In some embodiments, a method of self-calibrating a radio system comprising an antenna system comprising a plurality of antenna elements, a plurality of transmit branches coupled to the plurality of antenna elements, respectively, and a plurality of receive branches coupled to the plurality of antenna elements, respectively, is provided. In some embodiments, the method comprises performing a number of actions for a first predefined measurement pattern that defines a first subset of the plurality of antenna elements as a plurality of transmit antenna elements and a second subset of the plurality of antenna elements as a plurality of receive antenna elements. The first subset of the plurality of antenna elements and the second subset of the plurality of antenna elements are disjoint sets. In particular, performing the actions for the first predefined measurement pattern comprises generating a plurality of orthogonal test signals for the plurality of transmit antenna elements, respectively, using a respective plurality of orthogonal codes and providing the plurality of orthogonal test signals to the antenna system such that the plurality of orthogonal test signals are simultaneously transmitted by the plurality of transmit antenna elements, respectively. Performing the actions for the first predefined measurement pattern further comprises receiving, from the antenna system, a plurality of combined receive signals received via the plurality of receive antenna elements, respectively, during the simultaneous transmission of the plurality of orthogonal test signals via the plurality of transmit antenna elements due to coupling between the plurality of receive antenna elements and the plurality of transmit antenna elements. Performing the actions for the first predefined measurement pattern further comprises, for each receive antenna element of the plurality of receive antenna elements, decoding the respective combined receive signal using a subset of the plurality of orthogonal codes used to generate the orthogonal test signals for a subset of the plurality of transmit antenna elements predefined for the receive antenna element to thereby provide a separate receive signal received via the receive antenna element from each transmit antenna element in the subset of the plurality of transmit antenna elements, wherein different subsets of the plurality of transmit antenna elements are predefined for different ones of the plurality of receive antenna elements. The method further comprises computing amplitude and phase calibration values for at least some of the plurality of transmit branches and/or at least some of the plurality of receive branches based on the separate receive signals received via the plurality of receive antenna elements from the respective subsets of the plurality of transmit antenna elements.

In some embodiments, generating the plurality of orthogonal test signals for the plurality of transmit antenna elements comprises generating the plurality of orthogonal test signals for the plurality of transmit antenna elements using a root sequence and a respective plurality of orthogonal codes. In some embodiments, the root sequence is a representation of a frequency domain signal consisting of a set of equal amplitude frequency tones equally spaced over a bandwidth used by the radio system. In some embodiments, the root sequence is a time domain signal that is a time domain representation of a frequency domain signal consisting of a set of equal amplitude frequency tones equally spaced over a bandwidth used by the radio system, and relative phase of the equal amplitude frequency tones is such that peak-to-average ratio on the time domain signal is minimized.

In some embodiments, each of the plurality of orthogonal codes is a Hadamard or OVSF code or Walsh code consisting of plurality of code values each being a value of +1 or −1.

In some embodiments, the plurality of antenna elements are arranged into a N×M matrix of antenna elements, wherein N+M≥6. The plurality of transmit antenna elements are distributed across the N×M matrix in a manner defined by the first predefined measurement pattern, and the plurality of receive antenna elements are distributed across the N×M matrix in a manner defined by the first predefined measurement pattern. In some embodiments, the plurality of transmit antenna elements are antenna elements in the N×M matrix of antenna elements for which an amount of coupling between any pair of those antenna elements is less than a predefined threshold amount and the plurality of transmit antenna elements are arranged such that possible transmit-receive antenna element combinations with dominant coupling is maximized. In some embodiments, for each receive antenna element of the plurality of receive antenna elements, the subset of the plurality of transmit antenna elements predefined for the receive antenna element consists of one or more of the plurality of transmit antenna elements for which an amount of coupling between each of the one or more of the plurality of transmit antenna elements and the receive antenna element is greater than a predefined threshold amount.

In some embodiments, the plurality of antenna elements are arranged into a N×M matrix of antenna elements, wherein N+M≥6. The first predefined measurement pattern is a diagonal measurement pattern that: defines the plurality of transmit antenna elements as antenna elements in the N×M matrix of antenna elements that form one or more first diagonals in the N×M matrix; and defines the plurality of receive antenna elements as antenna elements in the N×M matrix of antenna elements that form two or more second diagonals in the N×M matrix that are interleaved with the one or more first diagonals in the N×M matrix. In some embodiments, the first predefined measurement pattern defines the plurality of transmit antenna elements as antenna elements in the N×M matrix of antenna elements that form two or more first diagonals in the N×M matrix, and the two or more second diagonals are interleaved with the two or more first diagonals in the N×M matrix such that two of the two or more second diagonals are between each diagonally adjacent pair of the two or more first diagonals. In some embodiments, for a receive antenna element of the plurality of receive antenna elements, the subset of the plurality of transmit antenna elements predefined for the receive antenna element consists of: a nearest transmit antenna element above the receive antenna element in the N×M matrix of antenna elements; a nearest transmit antenna element below the receive antenna element in the N×M matrix of antenna elements; a nearest transmit antenna element to the right of the receive antenna element in the N×M matrix of antenna elements; a nearest transmit antenna element to the left of the receive antenna element in the N×M matrix of antenna elements; and a nearest transmit antenna element diagonal from the receive antenna element in the N×M matrix of antenna elements.

In some embodiments, the method further comprises performing a number of actions for a second predefined measurement pattern that defines a third subset of the plurality of antenna elements as a second plurality of transmit antenna elements and a fourth subset of the plurality of antenna elements as a second plurality of receive antenna elements, wherein the third subset of the plurality of antenna elements and the fourth subset of the plurality of antenna elements are disjoint sets. Performing a number of actions for the second predefined measurement pattern comprises generating a second plurality of orthogonal test signals for the second plurality of transmit antenna elements, respectively, using a base sequence and a respective plurality of orthogonal codes, and providing the second plurality of orthogonal test signals to the antenna system such that the second plurality of orthogonal test signals are simultaneously transmitted by the second plurality of transmit antenna elements, respectively. Performing a number of actions for the second predefined measurement pattern further comprises receiving, from the antenna system, a second plurality of combined receive signals received via the plurality of receive antenna elements, respectively, during the simultaneous transmission of the second plurality of orthogonal test signals via the second plurality of transmit antenna elements due to coupling between the second plurality of receive antenna elements and the second plurality of transmit antenna elements. Performing a number of actions for the second predefined measurement pattern further comprises, for each receive antenna element of the second plurality of receive antenna elements, decoding the respective second combined receive signal using a subset of the second plurality of orthogonal codes used to generate the orthogonal test signals for a subset of the second plurality of transmit antenna elements predefined for the receive antenna element to thereby provide a separate receive signal received via the receive antenna element from each transmit antenna element in the subset of the second plurality of transmit antenna elements, respectively, wherein different subsets of the second plurality of transmit antenna elements are predefined for different ones of the second plurality of receive antenna elements. The method further comprises computing the amplitude and phase calibration values for the at least some of the plurality of transmit branches and/or at least some of the plurality of receive branches based on the separate receive signals received via the plurality of receive antenna elements from the respective subsets of the plurality of transmit antenna elements and the separate receive signals received via the second plurality of receive antenna elements from the respective subsets of the second plurality of transmit antenna elements.

In some embodiments, for each receive antenna element of the plurality of receive antenna elements, the subset of the plurality of transmit antenna elements predefined for the receive antenna element consists of those transmit antenna elements from among the plurality of transmit antenna elements for which a coupling with the receive antenna element is predetermined to be greater than a predetermined threshold.

In some embodiments, generating the plurality of orthogonal test signals comprises generating the plurality of orthogonal test signals in the time domain. In some embodiments, generating the plurality of orthogonal test signals for the plurality of transmit antenna elements comprises generating the plurality of orthogonal test signals for the plurality of transmit antenna elements using a root sequence and a respective plurality of orthogonal codes, and the root sequence is a time domain root sequence comprising a plurality of sample values. Generating the plurality of orthogonal test signals for the plurality of transmit antenna elements further comprises, in the time domain for each transmit antenna element of the plurality of transmit antenna elements, for each code value in the respective orthogonal code, encoding a plurality of repetitions of the time domain root sequence using the code value to thereby provide the orthogonal test signal for the transmit antenna element.

In some embodiments, the method further comprises applying the amplitude and phase calibration values for the at least some of the plurality of transmit branches and/or the at least some of the plurality of receive branches.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 3 illustrates one example of an antenna array consisting of a two-dimensional (2D) matrix of antenna elements;

DETAILED DESCRIPTION

Figure 1:
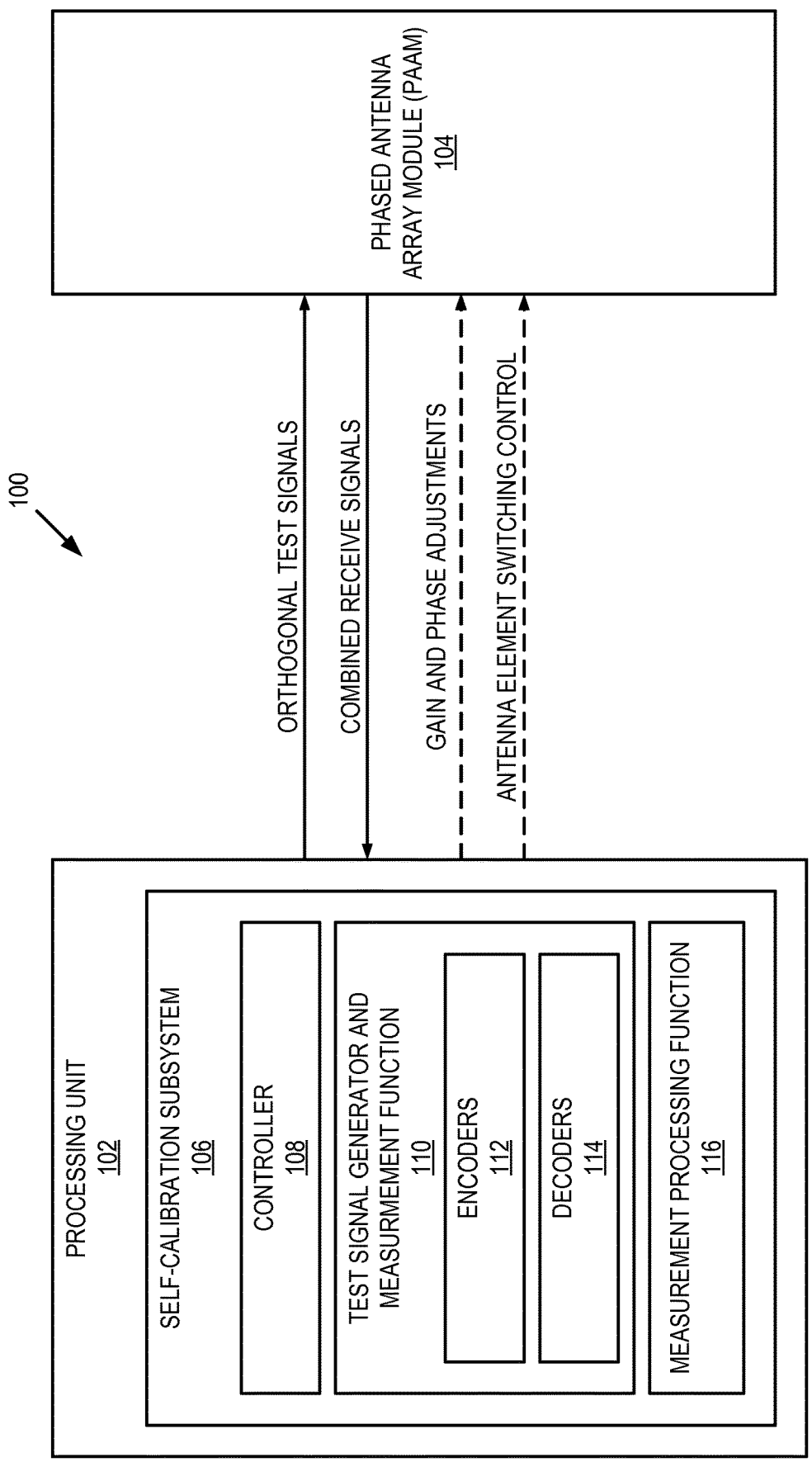
FIG. 1 illustrates an example embodiment of a radio system that provides self-calibration for an antenna array according to embodiments of the present disclosure.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

As discussed above, existing calibration procedures for a large antenna array radio system such as a 5G base station require an anechoic test chamber or dedicated coupler elements and are also time consuming. Systems and methods are described herein that provide a solution to these problems. In particular, systems and methods are disclosed herein that provide self-calibration of a large antenna array radio system using known mutual couplings between antenna elements in the antenna array, simultaneous transmission orthogonal test signals, and measurements of resulting coupled path signals. By using the known mutual couplings between antenna elements, measurements are obtained using the coupled path signals such that neither an anechoic chamber nor dedicated coupler elements are required. In addition, by using orthogonal test signals, multiple measurements can be obtained simultaneously. In this manner, the self-calibration procedure can be performed in an efficient manner. Still further, a sequence of measurement patterns is defined that enables all desired measurements to be obtained in an efficient manner (e.g., in a minimum number of measurement steps). In addition, systems and methods for encoding and decoding the orthogonal test signals are disclosed. In some embodiments, the orthogonal test signals are encoded and decoded in real time to minimize storage costs.

The systems and methods disclosed herein provide a number of advantages over conventional self-calibration systems and methods. For example, the frequency at which the self-calibration procedure needs to be performed (i.e., the calibration interval) is heavily dependent on temperature variation. For highly integrated base stations, temperature at critical components will change based on traffic load. Critical components cause phase drift versus temperature change. In reality, self-calibration needs to be performed several times per minute. During self-calibration, cell traffic needs to be stopped; hence, it is important to reduce the amount of time needed to perform self-calibration. The proposed solution is very time efficient. For example, it is expected that the proposed solution will reduce the amount of time needed for self-calibration by at least a factor ten compared to existing solutions.

Another advantage is that the self-calibration procedure disclosed herein can be performed by an efficient apparatus that performs the procedure at low cost with minimized storage needs. The systems and methods disclosed herein also minimize the amount of data to be moved from the radio circuitry (e.g., a radio Application Specific Integrated Circuit (ASIC)) to the baseband processing unit or the Central Processing Unit (CPU) where the calibration algorithm is performed.

In this regard, FIG. 1 illustrates an example embodiment of a radio system 100 that provides self-calibration for an antenna array according to embodiments of the present disclosure. The radio system 100 is also referred to herein as a beamforming transceiver. The radio system 100 is preferably a radio access node in a cellular communications network (e.g., a base station in a 3GPP 5G NR network). However, the radio system 100 may alternatively be, for example, an access point in a local wireless network (e.g., an access point in a WiFi network), a wireless communication device (e.g., a UE in a 3GPP 5G NR network), or the like. The radio system 100 performs beamforming via an antenna array. This beamforming may be, e.g., analog beamforming, which is performed by controlling gain and phase for each antenna branch via respective gain and phase control elements. However, it should be appreciated that, in some other embodiments, the radio system 100 may perform, e.g., hybrid beamforming, i.e., perform beamforming partly in the digital domain and partly in the analog domain or may perform digital beamforming (i.e., beamforming fully in the digital domain).

As illustrated, the radio system 100 includes a processing unit 102 and a Phased Antenna Array Module (PAAM) 104.

Note that the term "PAAM" is used herein only for reference. Other names may be used. For example, the PAAM 104 may also be referred to herein as an Advanced Antenna System (AAS) or simply an antenna system. In some embodiments, the PAAM 104 is implemented as one or more radio ASICs, and the processing unit 102 is a baseband processing unit implemented as, e.g., one or more processors such as, e.g., one or more CPUs, one or more baseband ASICs, one or more Field Programmable Gate Arrays (FPGAs), or the like, or any combination thereof.

As discussed below in detail, the PAAM 104 includes an antenna array. The antenna array includes many Antenna Elements (AEs). The PAAM 104 includes separate transmit branches (also referred to herein as transmit paths) and separate receive branches (also referred to herein as receive paths) for each AE. As an example, each transmit branch includes a gain control element and a phase control element that are controlled by the processing unit 102 to provide gain and phase calibration between the transmit branches and, in some embodiments, analog beamforming for signals transmitted by the radio system 100. Note that analog calibration and analog beamforming are shown herein as an example; however, the present disclosure is not limited thereto. Likewise, each receive branch includes a gain control element and a phase control element that are controlled by the processing unit 102 to provide gain and phase calibration between the receive branches, and in some embodiments, analog beamforming for signals received by the radio system 100.

The processing unit 102 includes a self-calibration subsystem 106. The self-calibration subsystem 106 may be implemented in hardware or a combination of hardware and software. In some embodiments, at least some of the functionality of the self-calibration subsystem 106 described herein is implemented in software that is executed by one or more processors (e.g., one or more CPUs, one or more ASICs, one or more FGPAs, or the like, or any combination thereof). The self-calibration subsystem 106 includes a controller 108, a test signal generator and measurement function 110 including in this example encoders 112 and decoders 114, and a measurement processing function 116. The controller 108 generally operates to control the self-calibration subsystem 106 and the PAAM 104 to perform a self-calibration procedure as described herein. The test signal generator and measurement function 110 includes the encoders 112 that generate orthogonal test signals, preferably in real-time and in the time domain using different orthogonal codes. In some embodiments, the orthogonal test signals are generated by applying different orthogonal codes to a common root sequence. In some embodiments, the root sequence is a representation (e.g., a time domain representation or a frequency domain representation) of a frequency domain signal consisting of a set of equal amplitude frequency tones equally spaced over a bandwidth used by the radio system 100. In some embodiments, the root sequence is a time domain signal that is a time domain representation of a frequency domain signal consisting of a set of equal amplitude frequency tones equally spaced over a bandwidth used by the radio system 100, and relative phase of the equal amplitude frequency tones is such that peak-to-average ratio on the time domain signal is minimized. In some embodiments, each of the orthogonal codes is a Hadamard or Orthogonal Variable Spreading Factor (OVSF) code or Walsh code consisting of code values each being a value of +1 or −1. The orthogonal test signals are provided to the PAAM 104 for simultaneous transmission by respective transmit AEs.

In response to the simultaneous transmission of the orthogonal test signals, the PAAM 104 provides received signals that are received via at least some receive AEs as a result of known mutual couplings between the transmit and receive AEs. Each of these received signals is a combination of signals received at the respective receive AE from the transmit AEs during simultaneous transmission of the orthogonal test signals due to mutual coupling. As such, these received signals are also referred to herein as "combined" signals. For each of these combined signals, the decoders 114 include decoders that simultaneously decode the combined signal, preferably in the time domain, to provide separate receive signals received via the respective receive AE from a limited subset of the transmit AEs. Preferably, the limited subset of the transmit AEs are those transmit AEs for which there is a dominant coupling with the receive AE. In other words, the limited subset of AEs are at least some of the transmit AEs for which the amount of coupling (i.e., the amplitude of the coupling) between that transmit AE and the receive AE is greater than a predefined threshold amount. After decoding, the resulting decoded signals are stored as measurements. Multiple measurement steps are performed until all desired measurements are obtained.

Once all of the desired measurements are obtained, the measurement processing function 116 processes the measurements to determine gain and phase calibration values for the transmit and receive branches of the PAAM 104. The controller 108 then controls the gain and phase control elements in the transmit and receive branches of the PAAM 104 in accordance with the determined gain and phase calibration values.

Note that the encoders 112 and decoders 114 may alternatively be implemented in the PAAM 104 such that the test signal generator and measurement function 110 sends a common test signal to the PAAM 104, and the encoders 112 encode the common test signal to create the orthogonal test signals. Likewise, the decoders 114 decode the combined signals at the PAAM 104 to create the separate receive signals, which are then provided to the processing unit 102 as respective measurements.

Figure 2:
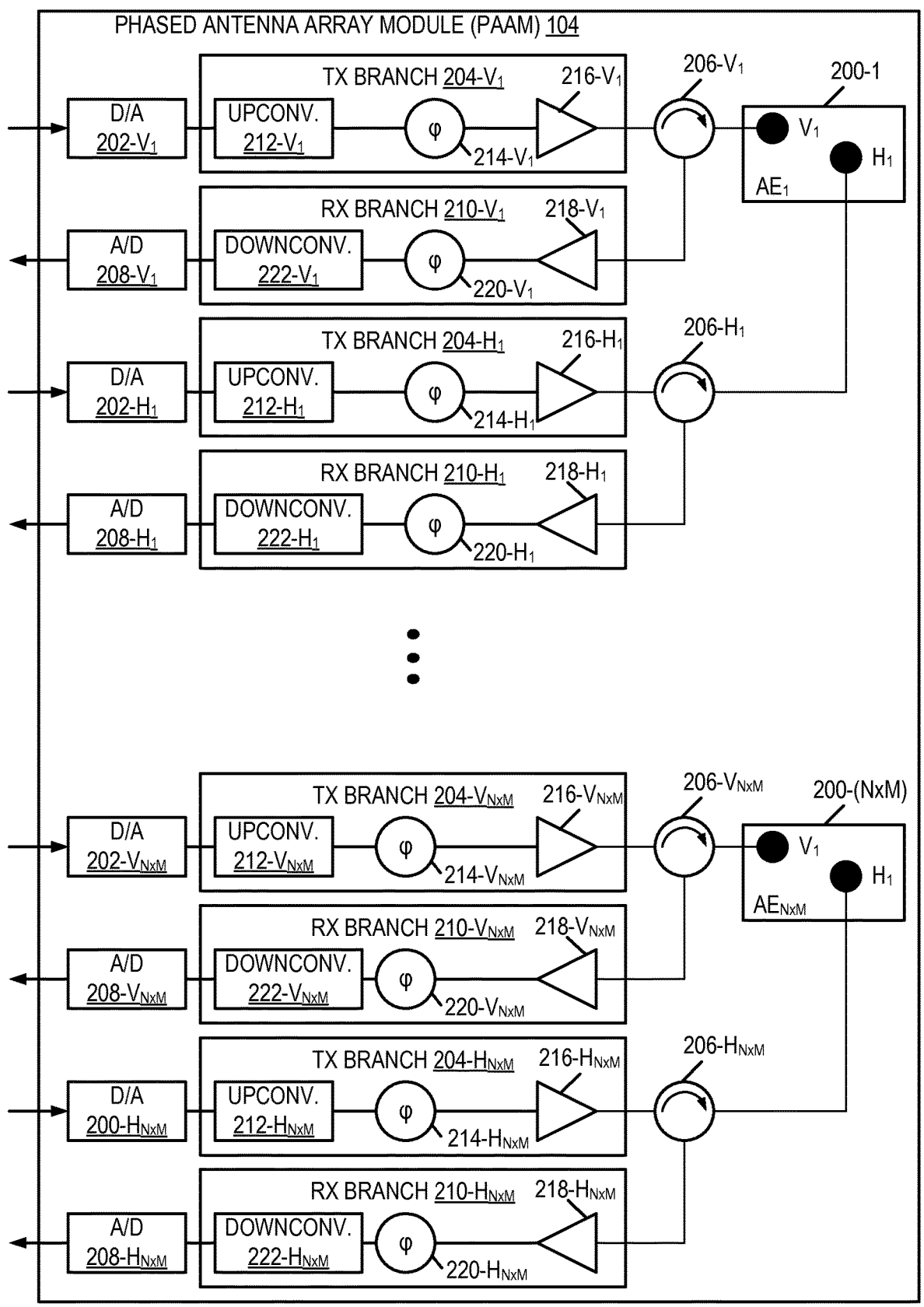
FIG. 2 illustrates one example of the Phased Array Antenna Module (PAAM) of FIG. 1 in accordance with some embodiments of the present disclosure.
Figure 3:
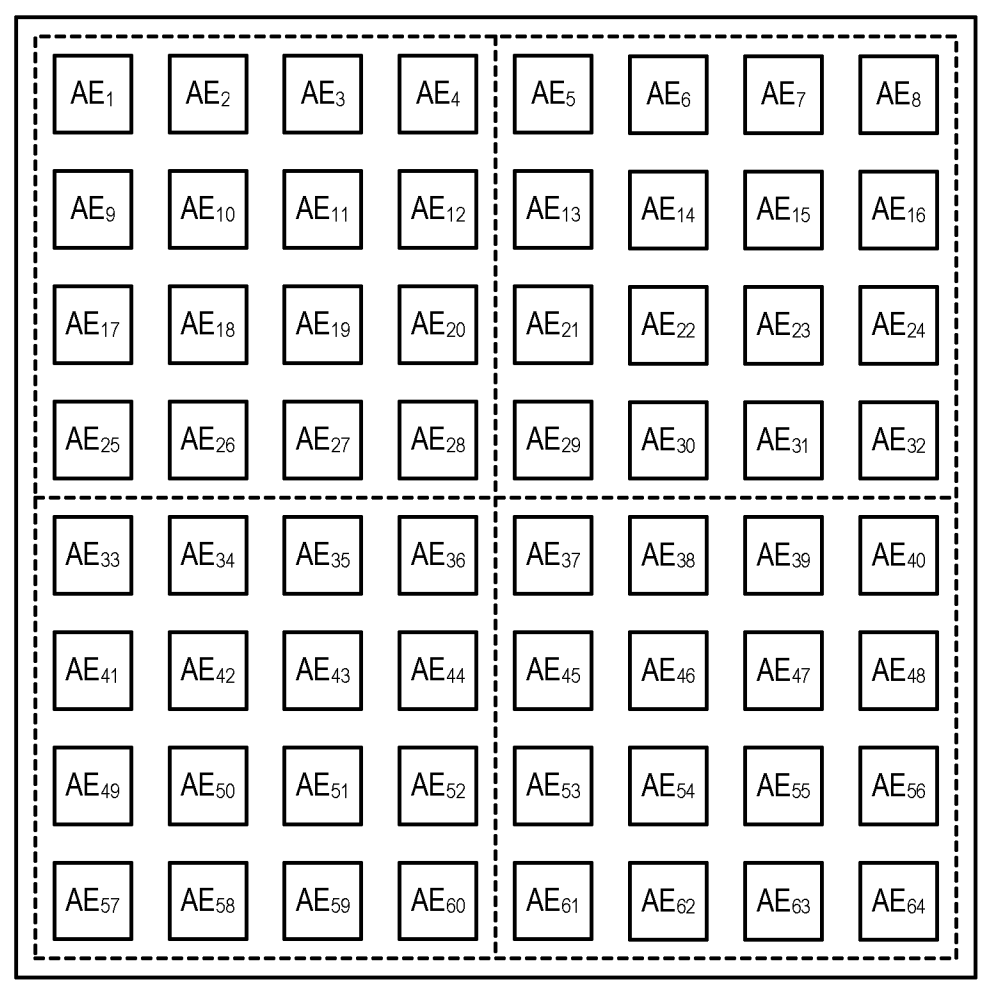

Before discussing the self-calibration procedure of the present disclosure in detail, a more detailed description of the PAAM 104 is beneficial. In this regard, FIG. 2 illustrates one example of the PAAM 104. As illustrated in FIG. 2, the PAAM 104 includes AEs 200-1 through 200-(N×M), where N×M defines the dimensions of a two-dimensional (2D) matrix of AEs into which the AEs 200-1 through 200-(N×M) are arranged. In some preferred embodiments, N+M≥6. The AEs 200-1 through 200-(N×M) are generally referred to herein collectively as AEs 200 and individually as AE 200. FIG. 3 illustrates one example of such a 2D matrix in which N=8 and M=8 such that there are 64 AEs 200 arranged into a 2D matrix. In the example of FIG. 3, the AEs 200 are implemented on four separate Integrated Circuits (ICs) (e.g., four separate radio ASICs), as indicated by the dashed boxes. Returning to FIG. 2, in the illustrated example, each AE 200 has two polarizations, namely, a vertical polarization and a horizontal polarization having respective inputs. For example, the AE 200-1 has a first Input/Output (I/O) connection point ($V_1$) for the vertical polarization and a second I/O connection point ($H_1$) for the horizontal polarization.

In this example with two polarizations, for the vertical polarization of each i-th AE 200-$i$ (where i=1, 2, . . . , N×M), the PAAM 104 includes a Digital to Analog (D/A) converter 202-$V_i$, and a transmit (TX) branch 204-$V_i$, coupled to the vertical I/O connection point ($V_i$) of the AE 200-$i$ via a circulator (duplexer or Rx-Tx switch), 206-$V_i$, for the transmit direction and an Analog to Digital (A/D) converter 208-$V_i$, and a receive (RX) branch 210-$V_i$ coupled to the vertical I/O connection point ($V_i$) of the AE 200-$i$ via the circulator 206-$V_i$. The TX branch 204-$V_i$ includes upconversion circuitry 212-$V_i$, a phase adjustor, or phase control element, 214-$V_i$, and an amplifier, or gain control element, 216-$V_i$. While not illustrated, the phase adjustor 214-$V_i$ and the amplifier 216-$V_i$ are controlled by the processing unit 102 to thereby control the gain and phase of the TX branch 204-$V_i$. Similarly, the RX branch 210-$V_i$ includes an amplifier, or gain control element, 218-$V_i$, a phase adjustor, or phase control element, 220-$V_i$, and downconversion circuitry 222-$V_i$. While not illustrated, the amplifier 218-$V_i$ and the phase adjustor 220-$V_i$ are controlled by the processing unit 102 to thereby control the gain and phase of the RX branch 210-$V_i$.

For the horizontal polarization of each i-th AE 200-$i$ (where i=1, 2, . . . , N×M), the PAAM 104 includes a D/A converter 202-$H_i$ and a TX branch 204-$H_i$ coupled to the horizontal I/O connection point ($H_i$) of the AE 200-$i$ via a circulator, or duplexer, 206-$H_i$ for the transmit direction and an A/D converter 208-$H_i$ and a RX branch 210-$H_i$ coupled to the horizontal I/O connection point ($H_i$) of the AE 200-$i$ via the circulator 206-$H_i$. The TX branch 204-$H_i$ includes upconversion circuitry 212-$H_i$, a phase adjustor, or phase control element, 214-$H_i$, and an amplifier, or gain control element, 216-$H_i$. While not illustrated, the phase adjustor 214-$H_i$ and the amplifier 216-$H_i$ are controlled by the processing unit 102 to thereby control the gain and phase of the TX branch 204-$H_i$. Similarly, the RX branch 210-$H_i$ includes an amplifier, or gain control element, 218-$H_i$, a phase adjustor, or phase control element, 220-$H_i$, and downconversion circuitry 222-$H_i$. While not illustrated, the amplifier 218-$H_i$ and the phase adjustor 220-$H_i$ are controlled by the processing unit 102 to thereby control the gain and phase of the RX branch 210-$H_i$.

Notably, when an AE 200-$i$ is configured for TX (i.e., coupled to the TX branch 204-$V_i$ and/or the TX branch 204-$H_i$), the AE 200-$i$ is referred to herein as a "TX AE" or "transmit AE." Conversely, when an AE 200-$i$ is configured for RX (i.e., coupled to the RX branch 210-$V_i$ and/or the RX branch 210-$H_i$), the AE 200-$i$ is referred to herein as a "RX AE" or "receive AE."

As discussed above, due to various factors such as temperature, aging, manufacturing tolerances, etc., gain and phase may vary between the TX branches 204 and may also vary between the RX branches 210. The processing unit 102, and in particular the self-calibration subsystem 106 of the processing unit 102, operates to perform a self-calibration procedure by which the radio system 100 calibrates gain and phase between the TX branches 204-$V_1$ through 204-$V_{N \times M}$, calibrates gain and phase between the TX branches 204-$H_1$ through 204-$H_{N \times M}$, calibrates gain and phase between the RX branches 210-$V_1$ through 210-$V_{N \times M}$, and calibrates gain and phase between the RX branches 210-$H_1$ through 210-$H_{N \times M}$. This self-calibration procedure uses known mutual couplings between the AEs 200-1 through 200-(N×M), which may be predetermined using any suitable technique such as, e.g., a factory calibration procedure or simulations.

In general, the self-calibration procedure obtains a number of measurements and then uses these measurements to determine gain and phase adjustments for the various TX and RX branches needed for calibration. The self-calibration procedure described herein relies on known mutual couplings between the AEs 200-1 through 200-(N×M). In other words, the self-calibration procedure relies on knowledge of leakages in the antenna matrix. Further, as discussed below, knowledge of dominating leakage paths is used to reduce the number of measurements that need to be made, thereby increasing the efficiency of the self-calibration procedure.

Figure 4:
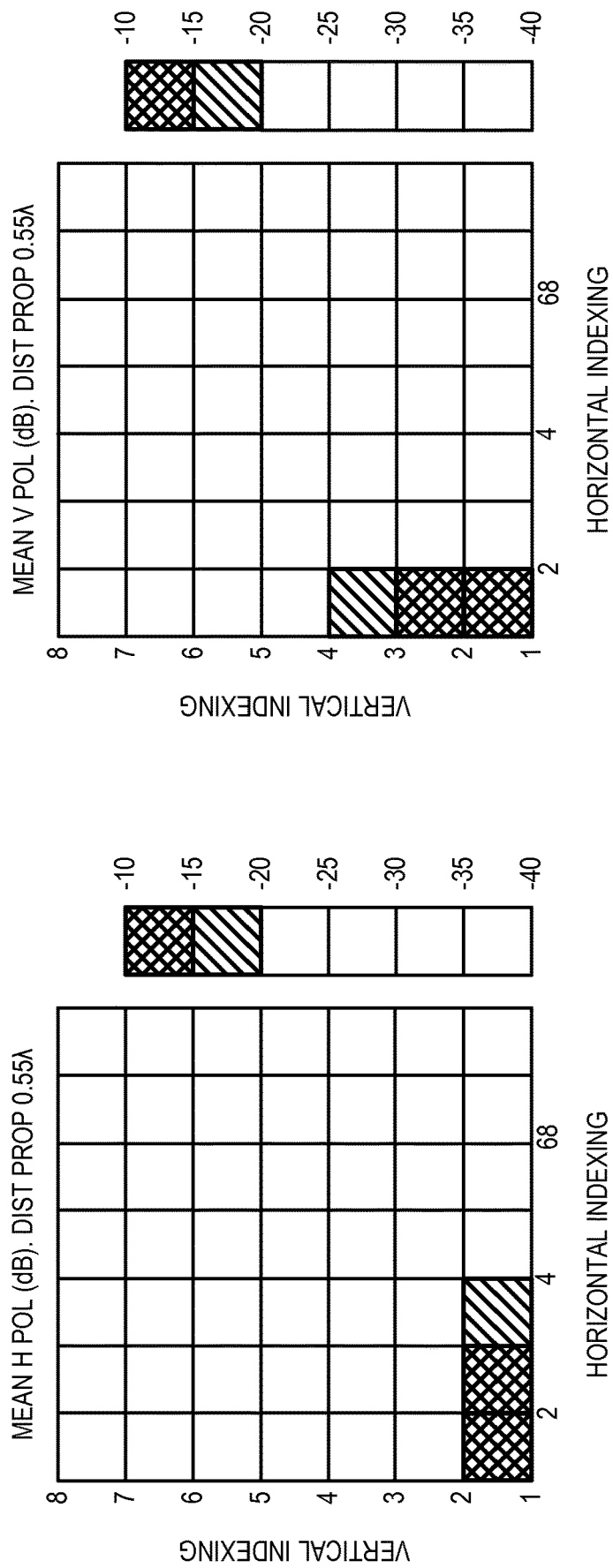
FIGS. 4 and 5 illustrate one example of simulated leakages between the antenna elements in an antenna matrix similar to that illustrated in FIG. 3 for a 28 gigahertz (GHz) carrier frequency.
Figure 5:
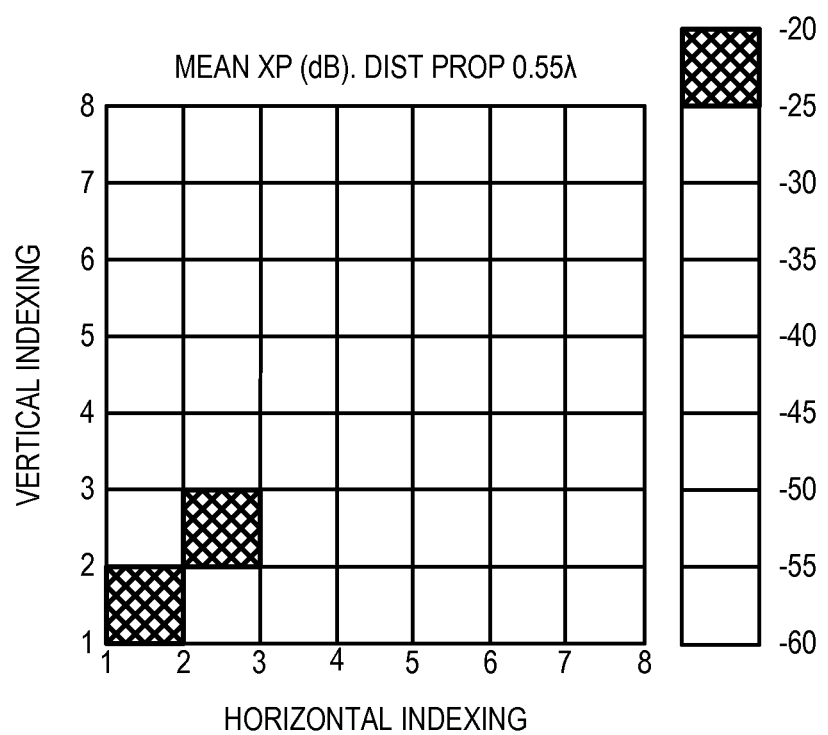

In this regard, FIGS. 4 and 5 illustrate one example of simulated leakages between the AEs 200 in an antenna matrix similar to that illustrated in FIG. 3 for a 28 gigahertz (GHz) carrier frequency. Note that the illustrated values are absolute values for relative positions between the AEs 200. Further, in FIG. 4, index 1,1 shows the reflected signal. In other words, the AE 200 at position 1,1 is configured as a TX AE, and the simulation results show the amount of leakage to the other AEs when a signal is transmitted via the TX AE at position 1,1. FIG. 4 illustrates simulated leakage when transmitting on the horizontal polarization (left side) and simulated leakage when transmitting on the vertical polarization (right side). As illustrated, for the horizontal polarization, the dominant leakage is to the two AEs immediately to the right of the TX AE and, while not shown, the two AEs immediately to the left of the TX AE. For the vertical polarization, the dominant leakage is to the two AEs above (in the vertical direction) the TX AE and, while not shown, the two AEs immediately below (in the vertical direction) the TX AE. FIG. 5 illustrates that, with respect to cross-coupling, the dominant leakage is to the one shown AE that is diagonal from the TX AE up and to the right and, while not shown, the other AE that is diagonal from the TX AE down and to the left.

Figure 6:
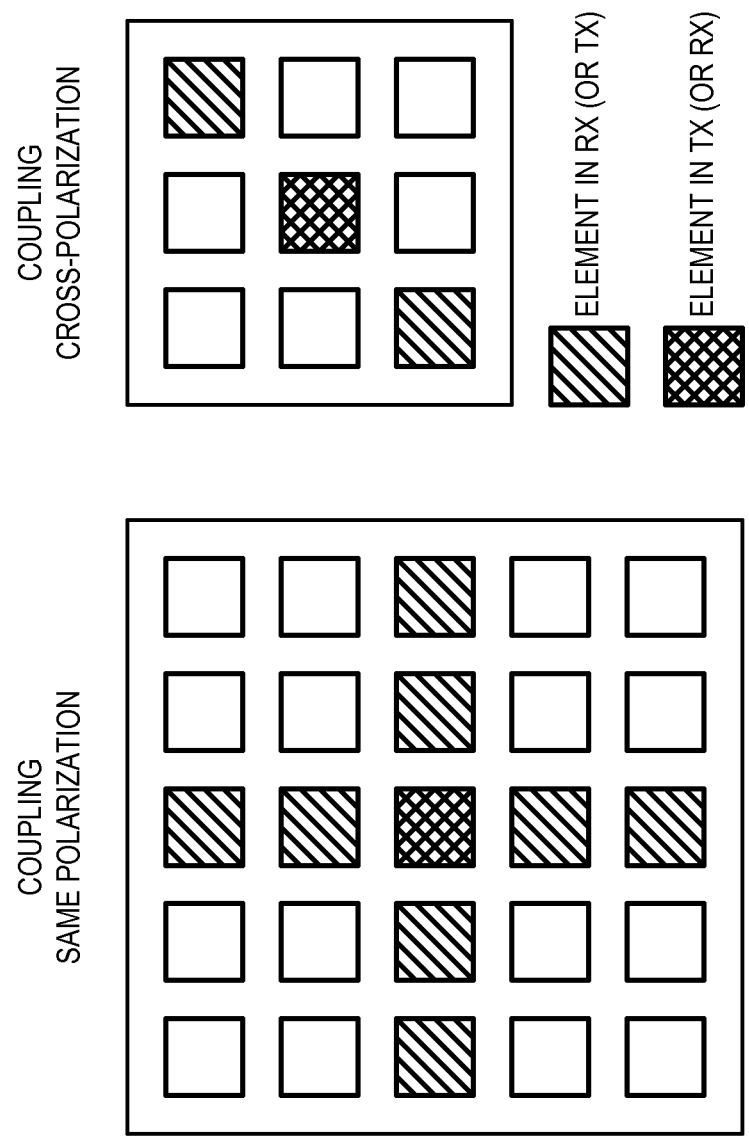
FIG. 6 illustrates one example of measurements that are desired to be made in order to capture dominant leakage in the particular example of FIGS. 3 through 5.

Based on these simulation results, FIG. 6 illustrates one example of the measurements that are desired to be made in order to capture the dominant leakage in this particular example. As illustrated, the central AE is the TX AE, and, for each polarization, ten (10) measurements are desired to capture the dominant leakage from this TX AE, where eight (8) of these measurements are for same polarization and two (2) of these measurements are for cross-polarization. In particular, for each polarization, same polarization measurements are desired between the TX AE and each of the two AEs immediately to the left of the TX AE, same polarization measurements are desired between the TX AE and each of the two AEs immediately to the right of the TX AE, same polarization measurements are desired between the TX AE and each of the two AEs immediately above the TX AE, same polarization measurements are desired between the TX AE and each of the two AEs immediately below the TX AE, and cross-polarization measurements between the TX AE and the AEs immediately adjacent to the TX on the diagonal up and to the right and on the diagonal down and to the left.

Figure 7A:
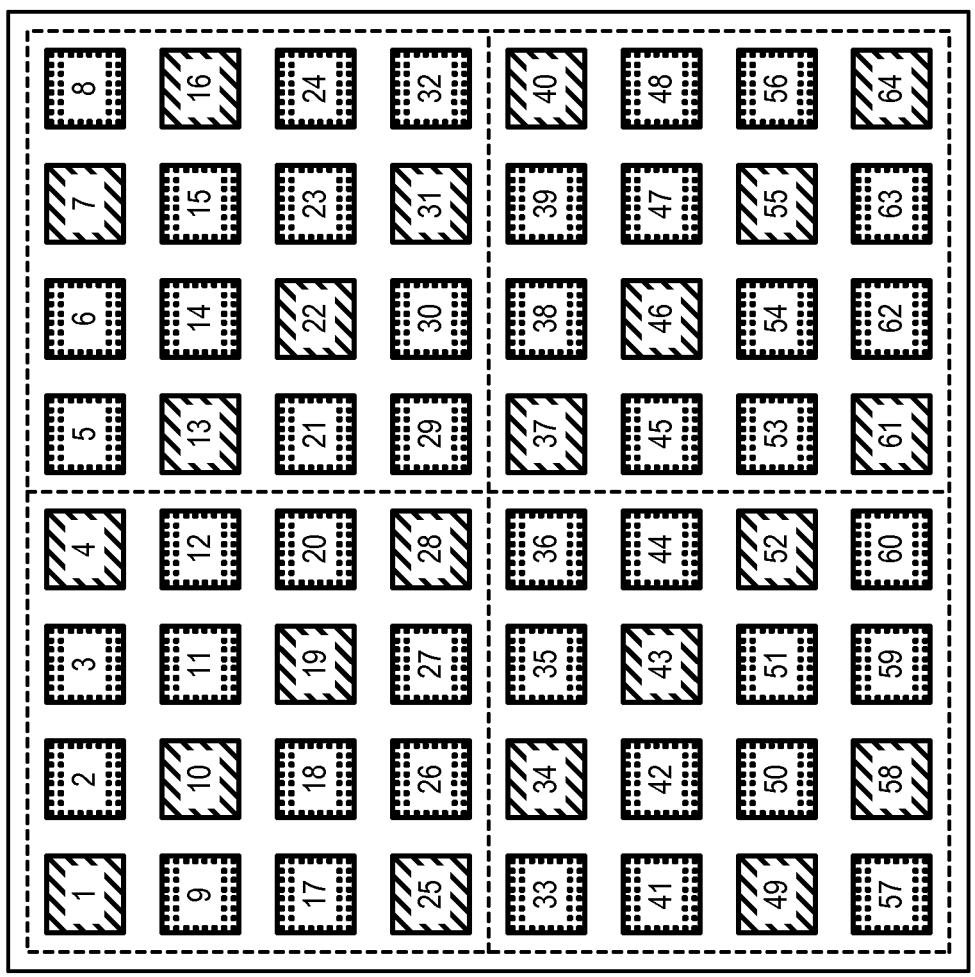
FIGS. 7A through 7C illustrate a series of measurement patterns that can be used in a self-calibration procedure to efficiently obtain the desired measurements illustrated in FIG. 6 according to some embodiments of the present disclosure.
Figure 7B:
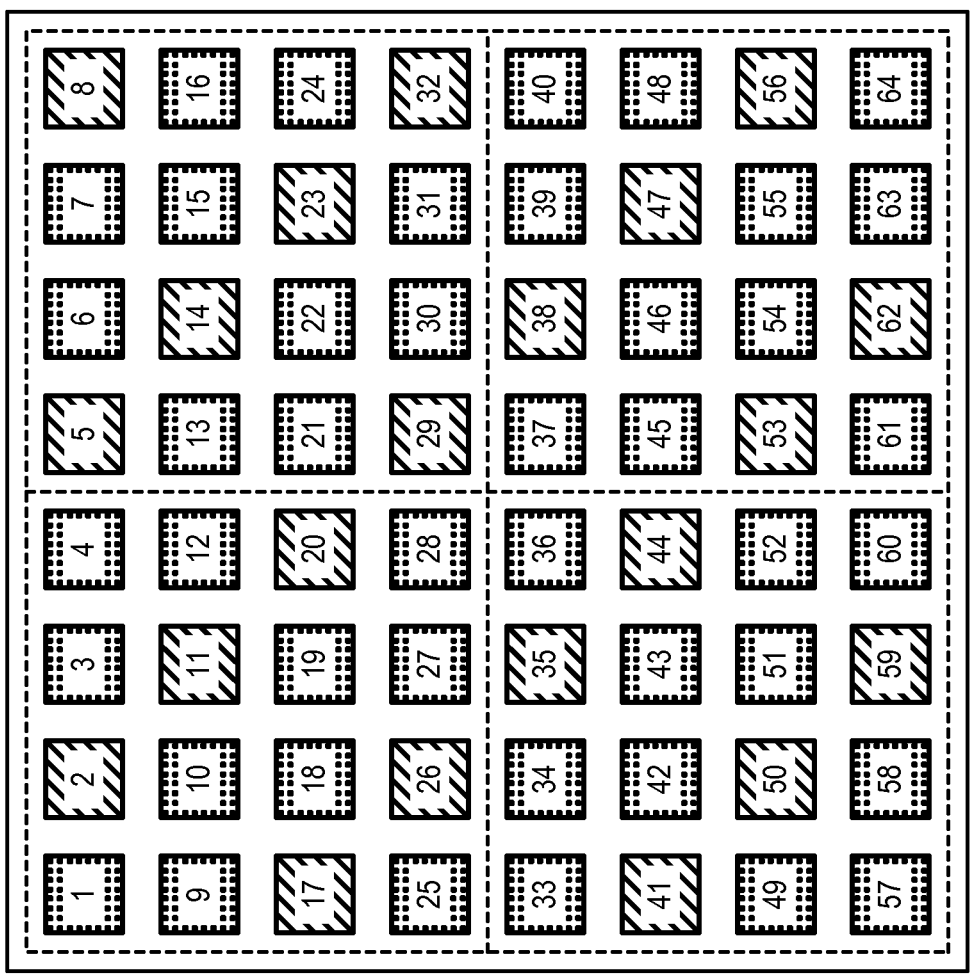
Figure 7C:
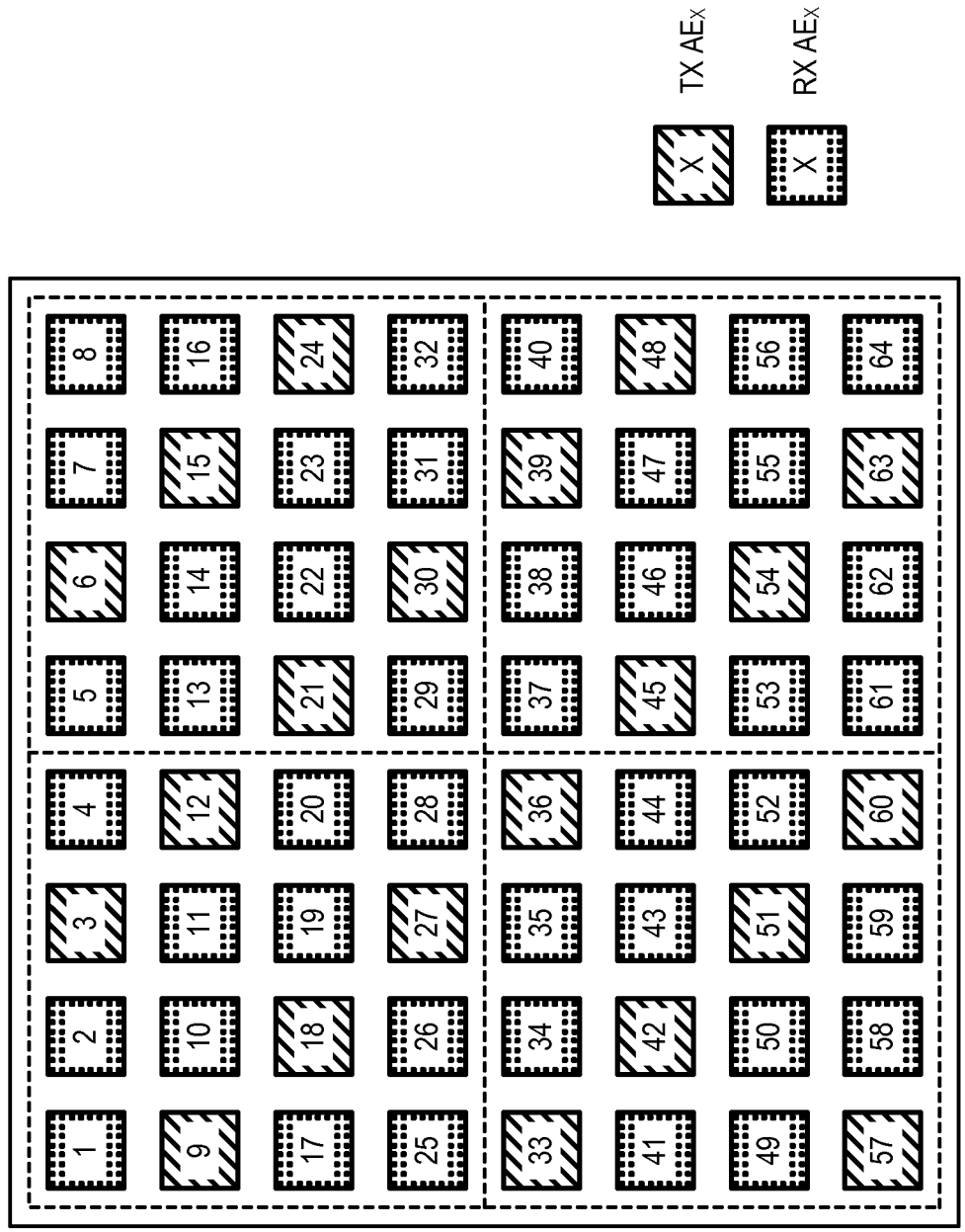

Using the knowledge of the dominant leakage paths and the measurements desired to capture only those dominant leakage paths, measurement patterns can be defined to efficiently obtain the desired measurements for all of the AEs 200 in the PAAM 104. Continuing the example above, FIGS. 7A through 7C illustrate a series of measurement patterns that can be used in the self-calibration procedure to efficiently obtain the desired measurements illustrated in FIG. 6. Each of these measurement patterns is referred to herein as a "diagonal" measurement pattern. Looking first at the diagonal measurement pattern of FIG. 7A, a first subset of the AEs 200 is configured as TX AEs. Starting at the bottom left-hand corner, these TX AEs are those AEs 200 along $2^{nd}$, $5^{th}$, $8^{th}$, $11^{th}$, and $14^{th}$ diagonals of the antenna matrix. Preferably, the TX AEs are selected such that the amount of coupling between the TX AEs is less than some predefined threshold and such that receive antenna combinations with dominating couplings is maximized. A second subset of the AEs 200 is configured as RX AEs. These RX AEs are those AEs 200 along the other diagonals of the antenna matrix, namely, the $1^{st}$, $3^{rd}$, $4^{th}$, $6^{th}$, $7^{th}$, $9^{th}$, $10^{th}$, $12^{th}$, $13^{th}$, and $15^{th}$ diagonals of the antenna matrix. The TX AE diagonals are interleaved with the RX AE diagonals such that two RX AE diagonals separate each adjacent pair of TX AE diagonals. In this manner, ⅓ of the AEs 200 are configured as TX AEs, and the other ⅔ of the AEs 200 are configured as RX AEs.

As described below in detail, orthogonal test signals are generated by the test signal generator and measurement function 110 of the self-calibration subsystem 106 and simultaneously transmitted via the TX AEs in the measurement pattern of FIG. 7A. A separate orthogonal test signal is transmitted for each TX AE for each polarization. Due to mutual coupling (i.e., due to leakage), a respective combined signal is received at each RX AE for each polarization during the simultaneous transmission of the orthogonal test signals via the TX AEs. For each RX AE and for each polarization, the respective combined signal is passed to the processing unit 102 via the respective RX branch $210\text{-}V_i$/$210\text{-}H_i$ where the combined signal is decoded for a limited subset of the TX AEs that correspond to the dominant leakage paths for that particular RX AE to thereby provide respective measurements. For example, looking at $AE_{27}$ in FIG. 7A, the limited subset of the TX AEs for which decoding is performed for RX $AE_{27}$ is $\{AE_{19}, AE_{25}, AE_{28}, AE_{34}, AE_{43}\}$. Thus, the combined signal received via the RX branch $210\text{-}H_{27}$ for the horizontal polarization is decoded to obtain the following measurements:

- a same-polarization measurement of the coupled signal from the horizontal polarization of $AE_{19}$,
- a same-polarization measurement of the coupled signal from the horizontal polarization of $AE_{25}$,
- a same-polarization measurement of the coupled signal from the horizontal polarization of $AE_{28}$,
- a same-polarization measurement of the coupled signal from the horizontal polarization of $AE_{43}$, and
- a cross-polarization measurement of the coupled signal from the vertical polarization of $AE_{34}$. Similarly, the combined signal received via the RX branch $210\text{-}V_{27}$ for the vertical polarization is decoded to obtain the following measurements:
- a same-polarization measurement of the coupled signal from the vertical polarization of $AE_{19}$,
- a same-polarization measurement of the coupled signal from the vertical polarization of $AE_{25}$,
- a same-polarization measurement of the coupled signal from the vertical polarization of $AE_{28}$,
- a same-polarization measurement of the coupled signal from the vertical polarization of $AE_{43}$, and
- a cross-polarization measurement of the coupled signal from the horizontal polarization of $AE_{34}$.

As illustrated in FIG. 7B, the diagonal measurement pattern of FIG. 7A is shifted and measurements are again obtained. Then, as illustrated in FIG. 7C, the diagonal measurement pattern of FIG. 7B is shifted once more and measurements are again obtained. At this point, all of the desired measurements are obtained. In other words, in only three measurement steps, all of the desired measurements for self-calibration can be obtained. In other words, all of the desired measurements illustrated in FIG. 6 are obtained for each AE 200 using only three measurement steps. This provides a very efficient self-calibration procedure.

Looking at both FIG. 6 and FIGS. 7A through 7C, it can be seen that, in the illustrated example, each RX AE is used to decode five signals from five different TX AEs for each polarization. Thus, in some embodiments, for each polarization, the decoders 114 include five separate decoders for each RX AE, as described below in detail.

Before proceeding, it should be noted that desired measurements illustrated in FIG. 6 and the diagonal measurement patterns of FIGS. 7A through 7C are only an example. More generally, the desired measurements are measurements between TX AEs and RX AEs for which there are dominant couplings, and the measurement patterns define TX AEs such that, for each measurement pattern, the TX AEs consist of a large number of the AEs that do not have any dominant couplings between them. In the example above, the TX AEs are therefore along the diagonals sloping downward from left to right. However, for other implementations, this may vary. Further, in the example above, the horizontal polarization is at 0 degrees, the vertical polarization is at 90 degrees, and the diagonal is at 45 degrees. However, the polarization directions may vary. For example, the horizontal direction may be at 45 degrees, the vertical direction may be at 135 degrees, and the diagonal direction may then be at 90 degrees. Thus, as used herein, a "diagonal" measurement pattern is one that is diagonal relative to the actual polarization directions.

Figure 8:
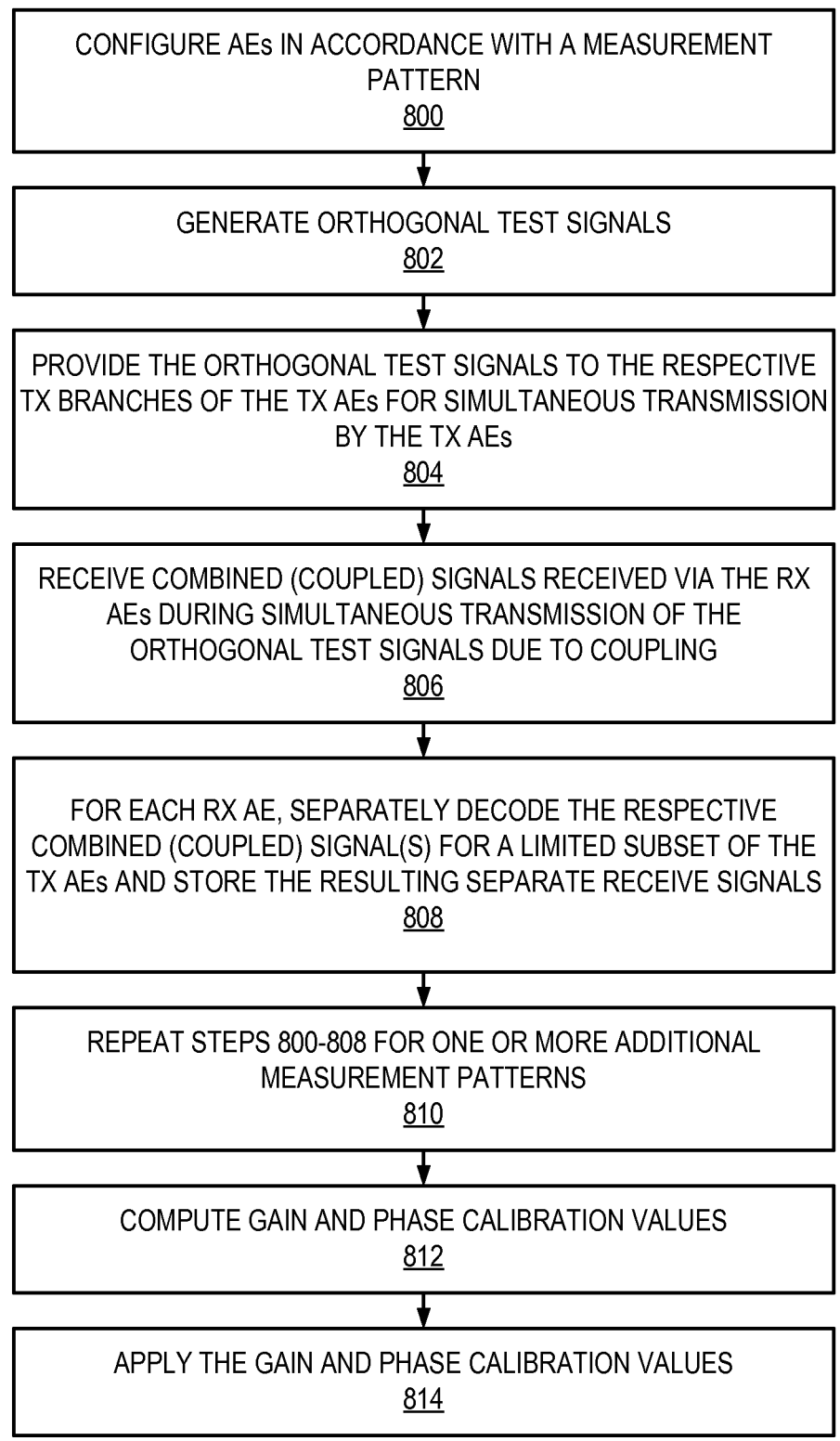
FIG. 8 is a flow chart that illustrates a self-calibration procedure in accordance with some embodiments of the present disclosure.

FIG. 8 is a flow chart that illustrates a self-calibration procedure performed by the self-calibration subsystem 106 of FIG. 1 in accordance with some embodiments of the present disclosure. As illustrated, the self-calibration subsystem 106, and in particular the controller 108, first configures the AEs 200 in accordance with a measurement pattern (step 800). More specifically, the measurement pattern defines a first subset of the AEs 200 as TX AEs and a second subset of the AEs 200 as RX AEs, where the first and second subsets are disjoint subsets of the AEs 200. In general, the measurement pattern is such that the TX AEs are distributed across the entire antenna matrix, and the RX AEs are also distributed across the entire antenna matrix. As an example, the measurement pattern is that of FIG. 7A where the first subset of AEs are those AEs along a first set of diagonals (referred to as TX AE diagonals) of the antenna matrix and the second subset of AEs are those AEs along a second set of diagonals (referred to as RX AE diagonals) of the antenna matrix. The TX AE diagonals and the RX AE diagonals are interleaved.

The self-calibration subsystem 106, and in particular the encoders 112 of the test signal generator and measurement function 110, generates orthogonal test signals to be simultaneously transmitted via the TX AEs (step 802). In the example in which each TX AE has two polarizations, a separate orthogonal test signal is generated for each TX AE for each polarization. Note, however, that if each TX AE only has a single polarization, then a separate orthogonal test signal is generated for each TX AE. While the details are described below, in some preferred embodiments, the orthogonal test signals are generated in the time domain by applying different orthogonal codes to a common root sequence. More specifically, for each orthogonal test signal, an orthogonal code of length $N_C$ is applied to the root sequence by applying the $N_C$ code values (e.g., where each code value is either +1 or −1) to $N_C$ repetitions of the root sequence, respectively. The self-calibration subsystem 106, and in particular the test signal generator and measurement function 110, provides the orthogonal test signals to the radio system 100 for simultaneous transmission via the respective TX branches 204-H, 204-V of the TX AEs (step 804).

Due to mutual coupling or leakage between the TX AEs and the RX AEs, during the simultaneous transmission of the orthogonal test signals via the TX AEs, resulting combined signals are received via the RX AEs (step 806). Using the example where each AE 200 has two polarizations, for each RX AE, a first combined signal is received via the I/O connection point (V) for the vertical polarization of the RX AE, where the first combined signal is the combination of the coupled signals from all of the TX AEs received for the vertical polarization of the RX AE. Likewise, for each RX AE, a second combined signal is received via the I/O connection point (H) for the horizontal polarization of the RX AE, where the second combined signal is the combination of the coupled signals from all of the TX AEs received for the horizontal polarization of the RX AE. For each RX AE for each polarization, the respective combined signal includes components due to the dominant leakages as well as components due to non-dominant leakages. During reception, the combined signals are received via the RX branches 210-V, 210-H coupled to the RX AEs and provided to the processing unit 102.

For each RX AE, the self-calibration subsystem 106, and in particular the respective decoders 114 of the test signal generator and measurement function 110, decode the combined signals received via the RX AE for a limited subset of the TX AEs that correspond to the dominant leakages to that particular RX AE and store the resulting separate receive signals received from the limited subset of TX AEs (step 808). Again, considering the embodiment in which there are two polarizations and using FIG. 7A as an example, consider the RX $AE_{27}$ as an example. For RX $AE_{27}$, the dominant leakages for this particular measurement pattern are from: TX $AE_{19}$, TX $AE_{25}$, TX $AE_{28}$, TX $AE_{34}$, and TX $AE_{43}$. As such, for the horizontal polarization, the decoders 114 include five decoders for the RX $AE_{27}$, where these five decoders for the RX $AE_{27}$ for the horizontal polarization include:

- a first decoder that decodes the combined signal received by the RX $AE_{27}$ for the horizontal polarization using the orthogonal code used to generate the orthogonal test signal transmitted by the TX $AE_{19}$ for the horizontal polarization,
- a second decoder that decodes the combined signal received by the RX $AE_{27}$ for the horizontal polarization using the orthogonal code used to generate the orthogonal test signal transmitted by the TX $AE_{25}$ for the horizontal polarization,
- a third decoder that decodes the combined signal received by the RX $AE_{27}$ for the horizontal polarization using the orthogonal code used to generate the orthogonal test signal transmitted by the TX $AE_{28}$ for the horizontal polarization,
- a fourth decoder that decodes the combined signal received by the RX $AE_{27}$ for the horizontal polarization using the orthogonal code used to generate the orthogonal test signal transmitted by the TX $AE_{43}$ for the horizontal polarization, and
- a fifth decoder that decodes the combined signal received by the RX $AE_{27}$ for the horizontal polarization using the orthogonal code used to generate the orthogonal test signal transmitted by the TX $AE_{34}$ for the vertical polarization.

Likewise, for the vertical polarization, the decoders 114 include five decoders for the RX $AE_{27}$, where these five decoders for the RX $AE_{27}$ for the vertical polarization include:

- a first decoder that decodes the combined signal received by the RX $AE_{27}$ for the vertical polarization using the orthogonal code used to generate the orthogonal test signal transmitted by the TX $AE_{19}$ for the vertical polarization,
- a second decoder that decodes the combined signal received by the RX $AE_{27}$ for the vertical polarization using the orthogonal code used to generate the orthogonal test signal transmitted by the TX $AE_{25}$ for the vertical polarization,
- a third decoder that decodes the combined signal received by the RX $AE_{27}$ for the vertical polarization using the orthogonal code used to generate the orthogonal test signal transmitted by the TX $AE_{25}$ for the vertical polarization,
- a fourth decoder that decodes the combined signal received by the RX $AE_{27}$ for the vertical polarization using the orthogonal code used to generate the orthogonal test signal transmitted by the TX $AE_{43}$ for the vertical polarization, and
- a fifth decoder that decodes the combined signal received by the RX $AE_{27}$ for the vertical polarization using the orthogonal code used to generate the orthogonal test signal transmitted by the TX $AE_{34}$ for the horizontal polarization.

In the same way, the decoders 114 include additional decoders for decoding the combined signals received via the other RX AEs.

The self-calibration subsystem 106 preferably performs one or more additional measurement steps by repeating steps 800 through 808 for one or more additional measurement patterns (step 810). Continuing the example from above, if the first measurement step uses the measurement pattern of FIG. 7A, then steps 800 through 808 are repeated for the measurement pattern of FIG. 7B and again for the measurement pattern of FIG. 7C to thereby obtain all of the desired measurements for self-calibration.

Once all of the desired measurements have been obtained, the self-calibration subsystem 106 and in particular the measurement processing function 116, computes gain and phase calibration values for the TX branches 204-$V_1$ through 204-$V_{N \times M}$, the TX branches 204-$H_1$ through 204-$H_{N \times M}$, the RX branches 210-$V_1$ through 204-$V_{N \times M}$, and the RX branches 210-$H_1$ through 204-$H_{N \times M}$ using any suitable technique (step 812). For instance, the coupling between a j-th TX AE and an i-th RX AE for one frequency can be expressed as:

$$y_{i,j} = r_i * h_{i,j} * t_j * s_j + n$$

where:
- $y_{i,j}$ is the received signal from the i-th RX AE after demodulation,
- $r_i$ is the unknown receiver response,
- $h_{i,j}$ is the known mutual coupling between the j-th TX AE and the i-th RX AE,
- $t_j$ is the unknown transmitter response,
- $s_j$ is the applied transmit signal prior to coding, and
- n is unknown noise and distortion.

From the measurements within one polarization, the above equation can be formulated covering all measurements in matrix form. Any suitable algorithm can then be used to solve these equations to estimate all r and t or deviations in r and t. Furthermore, cross-coupling measurements are used to align calibration on both polarizations. Note that the calibration of amplitude and phase is done per frequency bin defined by the frequency tones of the root sequence.

Once the gain and phase calibration values are computed, the self-calibration subsystem 106, and in particular the controller 108, applies the phase and gain calibration values via the gain and phase control elements in the TX and RX branches 204/210 (step 814). This self-calibration procedure may be repeated as desired to update the gain and phase calibration values.

Figure 9:
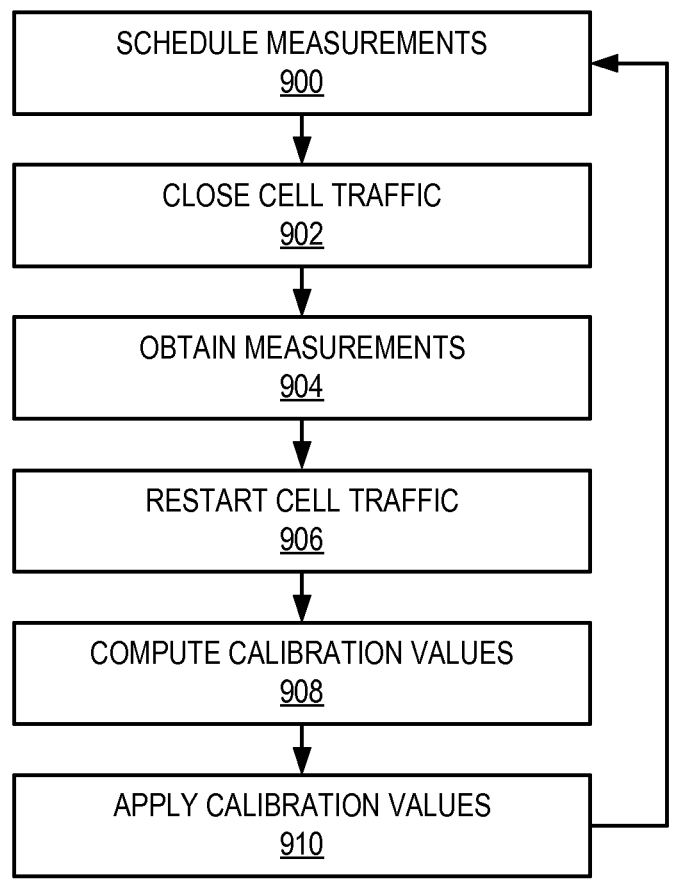
FIG. 9 is a flow chart that illustrates the operation of the radio system to utilize the self-calibration procedure of FIG. 8 in an embodiment in which the radio system is a base station in a cellular network in accordance with some embodiments of the present disclosure.

FIG. 9 is a flow chart that illustrates the operation of the radio system 100 to utilize the self-calibration procedure of FIG. 8 in an embodiment in which the radio system 100 is a base station in a cellular network in accordance with some embodiments of the present disclosure. In this procedure, the radio system 100 closes cell traffic while performing the desired measurements for self-calibration. In other words, the radio system 100 goes offline to perform the desired measurements. As illustrated, the radio system 100 schedules a period of time to perform measurements for self-calibration (step 900). During the scheduled period of time, the radio system 100 closes cell traffic (step 902) and obtains the desired measurements (step 904). The measurements are obtained in accordance with steps 800-810 of FIG. 8. Once the measurements are obtained, the radio system 100 restarts cell traffic (step 906). The radio system 100 computes the gain and phase calibration values, e.g., as described above with respect to step 812 of FIG. 8 (step 908) and applies the calibration values, e.g., as described above with respect to step 814 of FIG. 8 (step 910). Preferably, the calibration values are computed and applied while the cell traffic is open. In this manner, the amount of time that the cell is closed for self-calibration is minimized.

The self-calibration procedure described herein utilizes orthogonal test signals. As an example, when using a diagonal measurement pattern such as those illustrated in FIGS. 7A through 7C for dual-polarization, the number of orthogonal test signals is $2 \times \frac{1}{3}(N \times M)$. For example, if N=M=8, then the number of orthogonal test signals needed is 44. As one specific example, consider an embodiment in which the radio system 100 is a 3GPP NR base station (i.e., a gNB), N=M=8, and the orthogonal test signals are to be transmitted in a 400 megahertz (MHz) band. The sampling rate is 460.8 mega-samples per second (Msps). Therefore, there are 28,800 samples for 7 symbols. A suitable measurement length is one symbol. There is no need for many subcarriers for self-calibration since there are no components with rapidly changing delay variations. For this example, one measurement result per 10 MHz is assumed to be sufficient. A 64 complex sample time domain sequence is used to present a time domain signal corresponding to 64 tones. This gives 7.2 MHz distance between subcarriers. This sequence is referred to herein as a time domain root sequence. Each orthogonal test signal is created by repeating the time domain root sequence 64 times while multiplying the repetitions with a unique orthogonal code sequence for that test signal. Each code value in the code sequence is either +1 or −1, and each repetition of the time domain root sequence is multiplied by a respective code value from the code sequence. The resulting orthogonal test signal is a time sequence with a length of approximately one symbol. Preferably, coding (and likewise decoding) is performed in real-time. Decoding is performed prior to accumulation. Thus, the received signal/information is 64 samples per coupling. This minimizes information for buffering/transfer/algorithm calculations. Note that the 64 sample time domain root sequence is reused for all of the orthogonal test signals. It is built up from 64 tones with equal amplitude but phase relationship to minimize Peak to Average Ratio (PAR). Also note that, to reduce out of band transmissions, the time domain root sequence may be windowed (i.e., the root sequence may be tapered in the beginning and end to reduce spectrum widening due to abrupt phase shifts when changing code value).

Figure 10A:
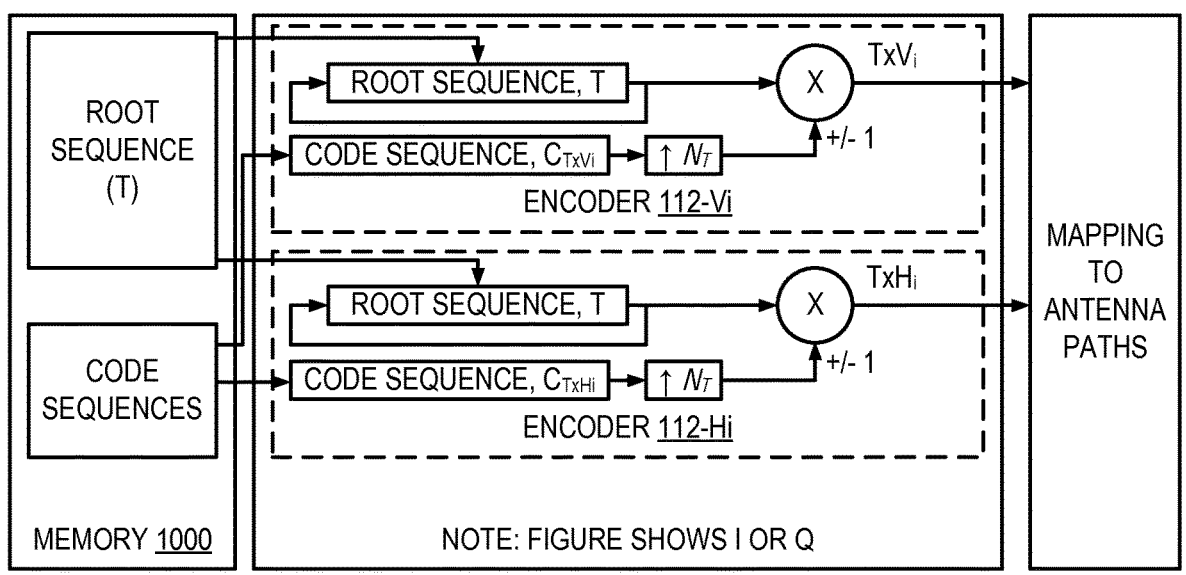
FIG. 10 illustrates one example of encoders and decoders used to generate the orthogonal test signals and to decode the resulting received signals in accordance with one example embodiment of the present disclosure.
Figure 10B:
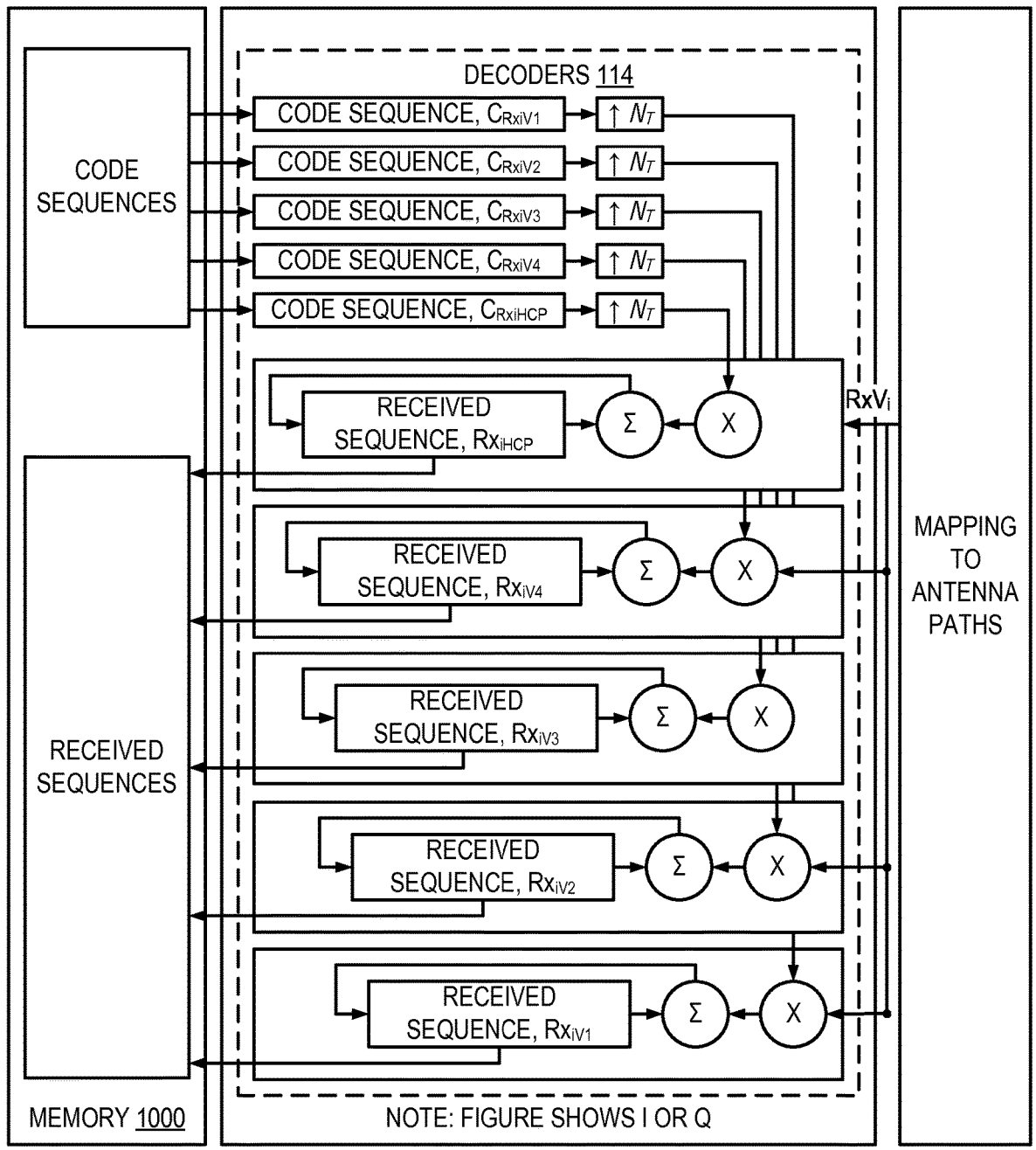
Figure 10C:
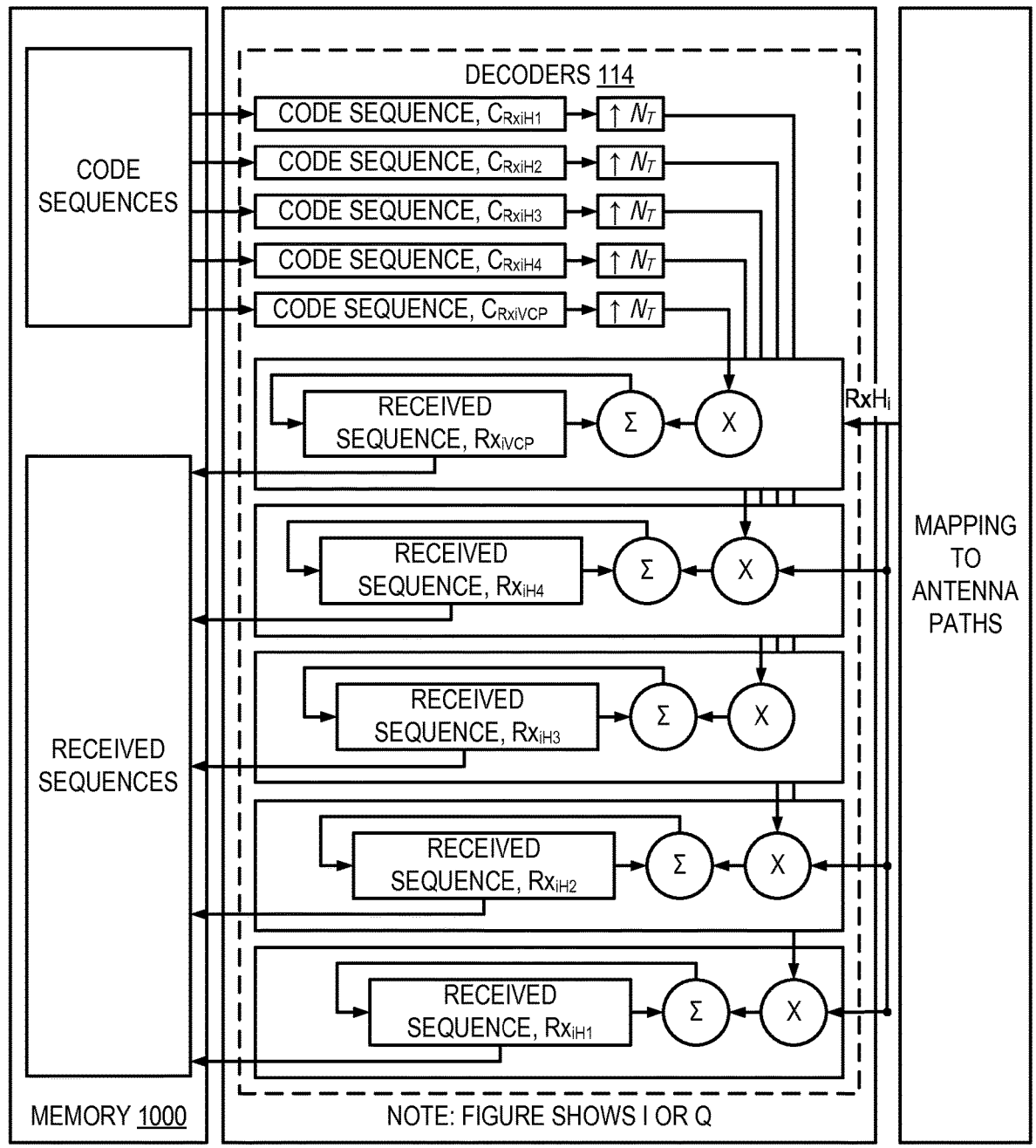

One example embodiment of the encoders 112 and decoders 114 for one of the AEs 200 is illustrated in FIGS. 10A through 10C, where FIG. 10A illustrates the encoders 112, FIG. 10B illustrates the decoders 114 for vertical polarization same and cross polarization measurements, and FIG. 10C illustrates the decoders for horizontal polarization same and cross polarization measurements. Note that this example assumes dual-polarization of the AE 200 and a diagonal measurement pattern such as that of FIGS. 7A through 7C. Further, the encoding and decoding is shown for either the real component (I) or the imaginary component (Q) of the signals. However, the encoding and decoding is performed for both I and Q (i.e., separate encoders 112 and decoders 114 are used for I and Q).

As illustrated in FIG. 10A, for a particular AE 200-$i$, when the AE 200-$i$ is configured as a TX AE for the self-calibration procedure, an encoder 112-$V_i$ obtains a time domain root sequence (T) from, in this example, memory 1000. The encoder 112-$V_i$ also obtains an orthogonal code sequence ($C^{TxVi}$) from memory 1000. If the encoders 112 and decoders 114 are implemented at the processing unit 102, then the memory 1000 may be part of the processing unit 102. If the encoders 112 and decoders 114 are implemented in the PAAM 104, then the memory 1000 may be part of the PAAM 104. The encoder 112-$V_i$ multiplies $N_C$ repetitions of the time domain root sequence (T) by respective code values from the orthogonal code sequence ($C^{TxVi}$). As discussed above, each code value is either +1 or −1. This multiplication is performed, in the illustrated example, by upsampling the orthogonal code sequence ($C^{TxVi}$) by $N_T$, where $N_T$ is the number of samples in the time domain root sequence (T). The upsampled orthogonal code sequence ($C^{TxVi}$) is then multiplied with the $N_C$ repetitions of the time domain root sequence (T) to thereby provide the orthogonal test signal (TxV$_i$) for the vertical polarization for the AE 200-$i$.

Likewise, an encoder 112-$H_i$ obtains the time domain root sequence (T) and an orthogonal code sequence ($C_{TxHi}$) from memory 1000. The encoder 112-$H_i$ multiplies $N_C$ repetitions of the time domain root sequence (T) by respective code values from the orthogonal code sequence ($C_{TxHi}$). As discussed above, each code value is either +1 or −1. This multiplication is performed, in the illustrated example, by upsampling the orthogonal code sequence ($C_{TxHi}$) by $N_T$, where $N_T$ is the number of samples in the time domain root sequence (T). The upsampled orthogonal code sequence ($C_{TxHi}$) is then multiplied with the $N_C$ repetitions of the time domain root sequence (T) to thereby provide the orthogonal test signal (TxH$_i$) for the horizontal polarization for the AE 200-$i$. The orthogonal test signals for the vertical and horizontal polarizations of the AE 200-$i$ are mapped to the TX branch 204-$V_i$ and the TX branch 204-$H_i$ such that these orthogonal test signals are simultaneously transmitted by the AE 200-I (along with corresponding orthogonal test signals transmitted by the other TX AEs). Note that while the root sequence is a time-domain root sequence in the example embodiment illustrated in FIG. 10A, the root sequence may alternatively be a frequency-domain root sequence where the code sequences can be applied to the frequency domain root sequence in the frequency domain before transformation to the time domain.

As illustrated in FIG. 10B, when the AE 200-$i$ is configured as a RX AE for the self-calibration procedure, for this particular example, the decoders 114 for the AE 200-$i$ include five decoders to perform decoding for the AE 200-$i$ to obtain measurements for the vertical polarization for the limited subset of the TX AEs that correspond to its dominant leakage paths. The first decoder for the vertical polarization obtains the code sequence ($C_{RxV1}$) used for encoding the orthogonal test signal transmitted by a first TX AE for the vertical polarization, upsamples the code sequence ($C_{RxV1}$) by $N_T$, and multiples the upsampled code sequence with the combined signal (RxV$_i$) received for the vertical polarization for the AE 200-$i$. This is repeated for $N_C$ repetitions and the results are accumulated, or summed, to thereby provide a received signal that represents a same-polarization measurement of the test signal received on the vertical polarization of the AE 200-$i$ from the vertical polarization of the first TX AE. This measurement is, in this example, stored in the memory 1000.

Likewise, the second decoder for the vertical polarization obtains the code sequence ($C_{Rxv2}$) used for encoding the orthogonal test signal transmitted by a second TX AE for the vertical polarization, upsamples the code sequence ($C_{Rxv2}$) by $N_T$, and multiples the upsampled code sequence with the combined signal (RxV$_i$) received for the vertical polarization for the AE 200-$i$. This is repeated for $N_C$ repetitions and the results are accumulated, or summed, to thereby provide a received signal that represents a same-polarization measurement of the test signal received on the vertical polarization of the AE 200-$i$ from the vertical polarization of the second TX AE. This measurement is, in this example, stored in the memory 1000.

The third decoder for the vertical polarization obtains the code sequence ($C_{RxV3}$) used for encoding the orthogonal test signal transmitted by a third TX AE for the vertical polarization, upsamples the code sequence ($C_{RxV3}$) by $N_T$, and multiples the upsampled code sequence with the combined signal (RxV$_i$) received for the vertical polarization for the AE 200-$i$. This is repeated for $N_C$ repetitions and the results are accumulated, or summed, to thereby provide a received signal that represents a same-polarization measurement of the test signal received on the vertical polarization of the AE 200-$i$ from the vertical polarization of the third TX AE. This measurement is, in this example, stored in the memory 1000.

The fourth decoder for the vertical polarization obtains the code sequence ($C_{RxV4}$) used for encoding the orthogonal test signal transmitted by a fourth TX AE for the vertical polarization, upsamples the code sequence ($C_{RxV4}$) by $N_T$, and multiples the upsampled code sequence with the combined signal (RxV$_i$) received for the vertical polarization for the AE 200-$i$. This is repeated for $N_C$ repetitions and the results are accumulated, or summed, to thereby provide a received signal that represents a same-polarization measurement of the test signal received on the vertical polarization of the AE 200-$i$ from the vertical polarization of the fourth TX AE. This measurement is, in this example, stored in the memory 1000.

The fifth decoder obtains the code sequence ($C_{RxHCP}$) used for encoding the orthogonal test signal transmitted by a fifth TX AE for the horizontal polarization, upsamples the code sequence ($C_{RxHCP}$) by $N_T$, and multiples the upsampled code sequence with the combined signal (RxV$_i$) received for the vertical polarization for the AE 200-$i$. This is repeated for $N_C$ repetitions and the results are accumulated, or summed, to thereby provide a received signal that represents a cross-polarization measurement of the test signal received on the vertical polarization of the AE 200-$i$ from the horizontal polarization of the second TX AE. This measurement is, in this example, stored in the memory 1000. If the decoders 114 are implemented in the PAAM 104, the measurements are transferred from the memory 1000 to the processing unit 102. Note that, using AE$_{27}$ of FIG. 7A as an example of the AE 200-$i$, the first TX AE is AE$_{25}$, the second TX AE is AE$_{28}$, the third TX AE is AE$_{19}$, the fourth TX AE is AE$_{43}$, and the fifth TX AE is AE$_{34}$.

As illustrated in FIG. 100, when the AE 200-$i$ is configured as a RX AE for the self-calibration procedure, for this particular example, the decoders 114 for the AE 200-$i$ also include five decoders to perform decoding for the AE 200-$i$ to obtain measurements for the horizontal polarization for the limited subset of the TX AEs that correspond to its dominant leakage paths. The first decoder for the horizontal polarization obtains the code sequence ($C_{RxH1}$) used for encoding the orthogonal test signal transmitted by a first TX AE for the horizontal polarization, upsamples the code sequence ($C_{RxH1}$) by $N_T$, and multiples the upsampled code sequence with the combined signal (RxH$_i$) received for the horizontal polarization for the AE 200-$i$. This is repeated for $N_C$ repetitions and the results are accumulated, or summed, to thereby provide a received signal that represents a same-polarization measurement of the test signal received on the horizontal polarization of the AE 200-$i$ from the horizontal polarization of the first TX AE. This measurement is, in this example, stored in the memory 1000.

Likewise, the second decoder for the horizontal polarization obtains the code sequence ($C_{RxH2}$) used for encoding the orthogonal test signal transmitted by a second TX AE for the horizontal polarization, upsamples the code sequence ($C_{RxH2}$) by $N_T$, and multiples the upsampled code sequence with the combined signal (RxH$_i$) received for the horizontal polarization for the AE 200-$i$. This is repeated for $N_C$ repetitions and the results are accumulated, or summed, to thereby provide a received signal that represents a same-polarization measurement of the test signal received on the horizontal polarization of the AE 200-$i$ from the horizontal polarization of the second TX AE. This measurement is, in this example, stored in the memory 1000.

The third decoder for the horizontal polarization obtains the code sequence ($C_{RxH3}$) used for encoding the orthogonal test signal transmitted by a third TX AE for the horizontal polarization, upsamples the code sequence ($C_{RxH3}$) by $N_T$, and multiples the upsampled code sequence with the combined signal (RxH$_i$) received for the horizontal polarization for the AE 200-$i$. This is repeated for $N_C$ repetitions and the results are accumulated, or summed, to thereby provide a received signal that represents a same-polarization measurement of the test signal received on the horizontal polarization of the AE 200-$i$ from the horizontal polarization of the third TX AE. This measurement is, in this example, stored in the memory 1000.

The fourth decoder for the horizontal polarization obtains the code sequence ($C_{RxH4}$) used for encoding the orthogonal test signal transmitted by a fourth TX AE for the horizontal polarization, upsamples the code sequence ($C_{RxH4}$) by $N_T$, and multiples the upsampled code sequence with the combined signal (RxH$_i$) received for the horizontal polarization for the AE 200-$i$. This is repeated for $N_C$ repetitions and the results are accumulated, or summed, to thereby provide a received signal that represents a same-polarization measurement of the test signal received on the horizontal polarization of the AE 200-$i$ from the horizontal polarization of the fourth TX AE. This measurement is, in this example, stored in the memory 1000.

The fifth decoder obtains the code sequence ($C_{RxVCP}$) used for encoding the orthogonal test signal transmitted by a fifth TX AE for the vertical polarization, upsamples the code sequence ($C_{RxVCP}$) by $N_T$, and multiples the upsampled code sequence with the combined signal (RxH$_i$) received for the horizontal polarization for the AE 200-$i$. This is repeated for N$_C$ repetitions and the results are accumulated, or summed, to thereby provide a received signal that represents a cross-polarization measurement of the test signal received on the horizontal polarization of the AE 200-$i$ from the vertical polarization of the second TX AE. This measurement is, in this example, stored in the memory 1000. If the decoders 114 are implemented in the PAAM 104, the measurements are transferred from the memory 1000 to the processing unit 102. Note that, using AE$_{27}$ of FIG. 7A as an example of the AE 200-$i$, the first TX AE is AE$_{25}$, the second TX AE is AE$_{28}$, the third TX AE is AE$_{19}$, the fourth TX AE is AE$_{43}$, and the fifth TX AE is AE$_{34}$.

Note that FIGS. 10A through 10C only show the encoders 112 and decoders 114 for one of the AEs 200 for clarity and ease of discussion. However, it should be appreciated that separate encoders 112 and decoders 114 are included for each of the AEs 200. Further, while the example of FIGS. 10A through 10C is for dual-polarization and a measurement pattern that results in five measurements per RX AE per polarization, the present disclosure is not limited thereto. The number of encoders 112 and decoders 114 needed per AE 200 will depend on the particular implementation (e.g., whether or not dual-polarization is used, the measurement pattern used, and the number of desired measurements (i.e., dominant leakage paths) per RX AE). Further, rather than having separate encoders 112 and decoders 114 for each AE for each polarization, the number of encoders 112 is preferably, for dual-polarization, two times the maximum number of simultaneous TX AEs in a measurement pattern, which is 44 for the scenario in which N=M=8. Likewise, the number of decoders 114 is preferably, when using the diagonal measurement patterns described herein, ten times the maximum number of RX AEs in a measurement pattern (assuming dual polarization), which is 215 for the scenario in which N=M=8. The number of encoders 112 can be reduced by reusing them for multiple TX AEs for the same measurement cycle, and/or the number of decoders 114 can be reduced by reusing them for multiple RX AEs for the same measurement cycle.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

At least some of the following abbreviations may be used in this disclosure. If there is an inconsistency between abbreviations, preference should be given to how it is used above. If listed multiple times below, the first listing should be preferred over any subsequent listing(s).

2D Two-Dimensional
3GPP Third Generation Partnership Project
5G Fifth Generation
AAS Advanced Antenna System
A/D Analog to Digital
AE Antenna Element
ASIC Application Specific Integrated Circuit
CPU Central Processing Unit
D/A Digital to Analog
eNB Enhanced or Evolved Node B
FPGA Field Programmable Gate Array
GHz Gigahertz
gNB New Radio Base Station
I Real Component
IC Integrated Circuit
I/O Input/Output
LTE Long Term Evolution
MHz Megahertz
MME Mobility Management Entity
Msps Mega-Samples per Second
MTC Machine Type Communication
NR New Radio
OVSF Orthogonal Variable Spreading Factor
PAAM Phased Array Antenna Module
PAR Peak to Average Ratio
P-GW Packet Data Network Gateway
Q Imaginary Component
RF Radio Frequency
RX Receive
SCEF Service Capability Exposure Function
TX Transmit
UE User Equipment Those skilled in the art will recognize improvements and modifications to the embodiments of the present disclosure. All such improvements and modifications are considered within the scope of the concepts disclosed herein.

What is claimed is:

1. A radio system, comprising:
   an antenna system comprising:
      a plurality of antenna elements;
      a plurality of transmit branches coupled to the plurality of antenna elements, respectively; and
      a plurality of receive branches coupled to the plurality of antenna elements, respectively; and
   a processing unit;
   wherein, together, the antenna system and the processing unit are adapted to:
      for a first predefined measurement pattern that defines a first subset of the plurality of antenna elements as a plurality of transmit antenna elements and a second subset of the plurality of antenna elements as a plurality of receive antenna elements, wherein the first subset of the plurality of antenna elements and the second subset of the plurality of antenna elements are disjoint sets:
         generate a plurality of orthogonal test signals for the plurality of transmit antenna elements, respectively, using a respective plurality of orthogonal codes;
         simultaneously transmit the plurality of orthogonal test signals via the plurality of transmit antenna elements, respectively;
         receive a plurality of combined receive signals received via the plurality of receive antenna elements, respectively, during the simultaneous transmission of the plurality of orthogonal test signals via the plurality of transmit antenna elements due to electromagnetic coupling between the plurality of receive antenna elements and the plurality of transmit antenna elements; and
         for each receive antenna element of the plurality of receive antenna elements, decode the respective combined receive signal using a subset of the plurality of orthogonal codes used to generate the orthogonal test signals for a subset of the plurality of transmit antenna elements predefined for the receive antenna element to thereby provide a separate receive signal received via the receive antenna element from each transmit antenna element in the subset of the plurality of transmit antenna elements, wherein different subsets of the plurality of transmit antenna elements are predefined for different ones of the plurality of receive antenna elements; and compute amplitude and phase calibration values for at least some of the plurality of transmit branches and/or at least some of the plurality of receive branches based on the separate receive signals received via the plurality of receive antenna elements from the respective subsets of the plurality of transmit antenna elements.

2. The radio system of claim 1 wherein:
the plurality of orthogonal test signals for the plurality of transmit antenna elements are generated using a root sequence and a respective plurality of orthogonal codes.

3. The radio system of claim 2 wherein the root sequence is a representation of a frequency domain signal consisting of a set of equal amplitude frequency tones equally spaced over a bandwidth used by the radio system.

4. The radio system of claim 2 wherein the root sequence is a time domain signal that is a time domain representation of a frequency domain signal consisting of a set of equal amplitude frequency tones equally spaced over a bandwidth used by the radio system, and relative phase of the equal amplitude frequency tones is such that peak-to-average ratio on the time domain signal is minimized.

5. The radio system of claim 1 wherein each of the plurality of orthogonal codes is a Hadamard or Orthogonal Variable Spreading Factor, OVSF, code or a Walsh code consisting of a plurality of code values each being a value of +1 or −1.

6. The radio system of claim 1 wherein:
the plurality of antenna elements are arranged into a N×M matrix of antenna elements, wherein N+M≥6;
the plurality of transmit antenna elements are distributed across the N×M matrix in a manner defined by the first predefined measurement pattern; and
the plurality of receive antenna elements are distributed across the N×M matrix in a manner defined by the first predefined measurement pattern.

7. The radio system of claim 6 wherein:
the plurality of transmit antenna elements are antenna elements in the N×M matrix of antenna elements for which an amount of electromagnetic coupling between any pair of those antenna elements is less than a predefined threshold amount and the plurality of transmit antenna elements are arranged such that possible transmit-receive antenna element combinations with dominant coupling is maximized.

8. The radio system of claim 7 wherein, for each receive antenna element of the plurality of receive antenna elements, the subset of the plurality of transmit antenna elements predefined for the receive antenna element consists of one or more of the plurality of transmit antenna elements for which an amount of electromagnetic coupling between each of the one or more of the plurality of transmit antenna elements and the receive antenna element is greater than a predefined threshold amount.

9. The radio system of claim 1 wherein:
the plurality of antenna elements are arranged into a N×M matrix of antenna elements, wherein N+M≥6; and
the first predefined measurement pattern is a diagonal measurement pattern that:
  defines the plurality of transmit antenna elements as antenna elements in the N×M matrix of antenna elements that form one or more first diagonals in the N×M matrix; and
  defines the plurality of receive antenna elements as antenna elements in the N×M matrix of antenna elements that form two or more second diagonals in the N×M matrix that are interleaved with the one or more first diagonals in the N×M matrix.

10. The radio system of claim 9 wherein:
the first predefined measurement pattern defines the plurality of transmit antenna elements as antenna elements in the N×M matrix of antenna elements that form two or more first diagonals in the N×M matrix; and
the two or more second diagonals are interleaved with the two or more first diagonals in the N×M matrix such that two of the two or more second diagonals are between each diagonally adjacent pair of the two or more first diagonals.

11. The radio system of claim 10 wherein, for a receive antenna element of the plurality of receive antenna elements, the subset of the plurality of transmit antenna elements predefined for the receive antenna element consists of:
a nearest transmit antenna element above the receive antenna element in the N×M matrix of antenna elements;
a nearest transmit antenna element below the receive antenna element in the N×M matrix of antenna elements;
a nearest transmit antenna element to the right of the receive antenna element in the N×M matrix of antenna elements;
a nearest transmit antenna element to the left of the receive antenna element in the N×M matrix of antenna elements; and
a nearest transmit antenna element diagonal from the receive antenna element in the N×M matrix of antenna elements.

12. The radio system of claim 1 wherein:
together, the antenna system and the processing unit are further adapted to:
  for a second predefined measurement pattern that defines a third subset of the plurality of antenna elements as a second plurality of transmit antenna elements and a fourth subset of the plurality of antenna elements as a second plurality of receive antenna elements, wherein the third subset of the plurality of antenna elements and the fourth subset of the plurality of antenna elements are disjoint sets:
    generate a second plurality of orthogonal test signals for the second plurality of transmit antenna elements, respectively, using a respective plurality of orthogonal codes;
    simultaneously transmit the second plurality of orthogonal test signals via the second plurality of transmit antenna elements, respectively;
    receive a second plurality of combined receive signals received via the plurality of receive antenna elements, respectively, during the simultaneous transmission of the second plurality of orthogonal test signals via the second plurality of transmit antenna elements due to electromagnetic coupling between the second plurality of receive antenna elements and the second plurality of transmit antenna elements; and
    for each receive antenna element of the second plurality of receive antenna elements, decode the respective second combined receive signal using a subset of the second plurality of orthogonal codes used to generate the orthogonal test signals for a subset of the second plurality of transmit antenna elements predefined for the receive antenna element to thereby provide a separate receive signal received via the receive antenna element from each transmit antenna element in the subset of the second plurality of transmit antenna elements, respectively, wherein different subsets of the second plurality of transmit antenna elements are predefined for different ones of the second plurality of receive antenna elements; and compute the amplitude and phase calibration values for the at least some of the plurality of transmit branches and/or at least some of the plurality of receive branches based on the separate receive signals received via the plurality of receive antenna elements from the respective subsets of the plurality of transmit antenna elements and the separate receive signals received via the second plurality of receive antenna elements from the respective subsets of the second plurality of transmit antenna elements.

13. The radio system of claim 1 wherein, for each receive antenna element of the plurality of receive antenna elements, the subset of the plurality of transmit antenna elements predefined for the receive antenna element consists of those transmit antenna elements from among the plurality of transmit antenna elements for which an electromagnetic coupling with the receive antenna element is predetermined to be greater than a predetermined threshold.

14. The radio system of claim 1 wherein the antenna system or the processing unit is further adapted to generate the plurality of orthogonal test signals in the time domain.

15. The radio system of claim 14 wherein:
the plurality of orthogonal test signals for the plurality of transmit antenna elements are generated using a root sequence and a respective plurality of orthogonal codes;
the root sequence is a time domain root sequence comprising a plurality of sample values; and
in order to generate the plurality of orthogonal test signals for the plurality of transmit antenna elements, respectively, the antenna system or the processing unit is further adapted to, in the time domain:
for each transmit antenna element of the plurality of transmit antenna elements, for each code value in the respective orthogonal code, encode a plurality of repetitions of the time domain root sequence using the code value to thereby provide the orthogonal test signal for the transmit antenna element.

16. The radio system of claim 1 wherein the processing unit is further adapted to apply the amplitude and phase calibration values for the at least some of the plurality of transmit branches and/or the at least some of the plurality of receive branches.

17. A method of self-calibrating a radio system comprising an antenna system comprising a plurality of antenna elements, a plurality of transmit branches coupled to the plurality of antenna elements, respectively, and a plurality of receive branches coupled to the plurality of antenna elements, respectively, the method comprising:

for a first predefined measurement pattern that defines a first subset of the plurality of antenna elements as a plurality of transmit antenna elements and a second subset of the plurality of antenna elements as a plurality of receive antenna elements, wherein the first subset of the plurality of antenna elements and the second subset of the plurality of antenna elements are disjoint sets:
generating a plurality of orthogonal test signals for the plurality of transmit antenna elements, respectively, using a respective plurality of orthogonal codes;
simultaneously transmitting the plurality of orthogonal test signals via the plurality of transmit antenna elements, respectively;
receiving a plurality of combined receive signals via the plurality of receive antenna elements, respectively, during the simultaneous transmission of the plurality of orthogonal test signals via the plurality of transmit antenna elements due to electromagnetic coupling between the plurality of receive antenna elements and the plurality of transmit antenna elements; and
for each receive antenna element of the plurality of receive antenna elements, decoding the respective combined receive signal using a subset of the plurality of orthogonal codes used to generate the orthogonal test signals for a subset of the plurality of transmit antenna elements predefined for the receive antenna element to thereby provide a separate receive signal received via the receive antenna element from each transmit antenna element in the subset of the plurality of transmit antenna elements, wherein different subsets of the plurality of transmit antenna elements are predefined for different ones of the plurality of receive antenna elements; and
computing amplitude and phase calibration values for at least some of the plurality of transmit branches and/or at least some of the plurality of receive branches based on the separate receive signals received via the plurality of receive antenna elements from the respective subsets of the plurality of transmit antenna elements.

18. The method of claim 17 wherein:
generating the plurality of orthogonal test signals for the plurality of transmit antenna elements comprises generating the plurality of orthogonal test signals for the plurality of transmit antenna elements using a root sequence and a respective plurality of orthogonal codes.

* * * * *